(12) United States Patent
Liu et al.

(10) Patent No.: US 11,082,161 B2
(45) Date of Patent: Aug. 3, 2021

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Liqing Liu, Sakai (JP); Shoichi Suzuki, Sakai (JP); Tomoki Yoshimura, Sakai (JP); Wataru Ouchi, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/495,850

(22) PCT Filed: Mar. 14, 2018

(86) PCT No.: PCT/JP2018/009970
§ 371 (c)(1),
(2) Date: Sep. 20, 2019

(87) PCT Pub. No.: WO2018/173885
PCT Pub. Date: Sep. 27, 2018

(65) Prior Publication Data
US 2020/0052830 A1 Feb. 13, 2020

(30) Foreign Application Priority Data
Mar. 22, 2017 (JP) .............................. JP2017-055586

(51) Int. Cl.
*H04L 1/18* (2006.01)
*H04W 72/14* (2009.01)
(Continued)

(52) U.S. Cl.
CPC .......... *H04L 1/1812* (2013.01); *H04L 1/0061* (2013.01); *H04L 5/14* (2013.01);
(Continued)

(58) Field of Classification Search
CPC ....... H04L 1/1812; H04L 1/0061; H04L 5/14; H04W 72/14; H04W 72/042;
(Continued)

(56) References Cited

U.S. PATENT DOCUMENTS

2018/0019844 A1* 1/2018 Nogami ................ H04L 5/0055
2018/0049271 A1* 2/2018 Bagheri .............. H04L 27/2601
(Continued)

FOREIGN PATENT DOCUMENTS

WO 2018/043562 A1 3/2018

OTHER PUBLICATIONS

Official Communication issued in International Patent Application No. PCT/JP2018/009970, dated Jun. 19, 2018.
(Continued)

*Primary Examiner* — Hassan Kizou
*Assistant Examiner* — Abdullahi Ahmed
(74) *Attorney, Agent, or Firm* — Keating & Bennett, LLP

(57) ABSTRACT

A terminal apparatus receives a PDCCH including a DCI format, and performs PUSCH transmission based on detection of the PDCCH. In an HARQ process corresponding to the PUSCH transmission, a value of an UL HARQ Round Trip Timer (RTT) timer for the HARQ process is provided based at least on a first condition and/or a second condition. The first condition is that a search space for the PDCCH detected is either a common search space or a UE-specific search space. The second condition is that a type of the HARQ process is either a synchronous HARQ or an asynchronous HARQ.

4 Claims, 17 Drawing Sheets

(51) Int. Cl.
*H04W 72/04* (2009.01)
*H04L 1/00* (2006.01)
*H04W 76/28* (2018.01)
*H04L 5/14* (2006.01)
*H04W 76/11* (2018.01)
*H04W 76/27* (2018.01)

(52) U.S. Cl.
CPC ..... *H04W 72/042* (2013.01); *H04W 72/0466* (2013.01); *H04W 72/14* (2013.01); *H04W 76/11* (2018.02); *H04W 76/27* (2018.02); *H04W 76/28* (2018.02)

(58) Field of Classification Search
CPC ..... H04W 76/28; H04W 76/11; H04W 76/27; H04W 72/0466
See application file for complete search history.

(56) References Cited

U.S. PATENT DOCUMENTS

| | | | | |
|---|---|---|---|---|
| 2018/0368174 | A1* | 12/2018 | Jeon | H04W 72/0446 |
| 2019/0215818 | A1 | 7/2019 | Takeda et al. | |
| 2019/0380112 | A1* | 12/2019 | Lee | H04L 1/1887 |
| 2020/0029385 | A1* | 1/2020 | Bergstrom | H04W 72/1289 |
| 2020/0052830 | A1* | 2/2020 | Liu | H04L 5/14 |

OTHER PUBLICATIONS

Ericsson, "New Work Item on shortened TTI and processing time for LTE", 3GPP TSG RAN Meeting #72, RP-161299, Jun. 13-16, 2016, 8 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.1.0, Dec. 2016, pp. 1-317.

Intel Corporation, "Protocol impacts of processing time reduction for legacy 1ms TTI", 3GPP TSG-RAN2 Meeting #97, R2-1701318, Feb. 13-17, 2017, pp. 1-5.

Huawei et al., "Impacts of shortened processing time on RAN2", 3GPP TSG-RAN WG2 Meeting #97, R2-1701882, Feb. 13-17, 2017, 3 pages.

Ericsson, "HARQ processes with fallback, asynchronous to synchronous HARQ", 3GPP TSG-RAN WG2 #97, Tdoc R2-1701606, Feb. 13-17, 2017, pp. 1-5.

Huawei et al., "Asynchronous UL HARQ", 3GPP TSG RAN WG1 Meeting #88, R1-1701746, Feb. 13-17, 2017, 4 pages.

Ericsson, "Impact of sTTI on MAC timers and DRX", 3GPP TSG-RAN WG2 #97, Tdoc R2-1701608, Feb. 13-17, 2017, pp. 1-7.

Ericsson, "Asynchronous HARQ for PUSCH", 3GPP TSG-RAN WG1 Meeting #88, R1-1703251, Feb. 13-17, 2017, pp. 1-3.

* cited by examiner

| UL-DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 4

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7,6 | 4 | - | - | - | 7,6 | 4 | - |
| 2 | - | - | 8,7,4,6 | - | - | - | - | 8,7,4,6 | - | - |
| 3 | - | - | 7,6,11 | 6,5 | 5,4 | - | - | - | - | - |
| 4 | - | - | 12,8,7,11 | 6,5,4,7 | - | - | - | - | - | - |
| 5 | - | - | 13,12,9,8,7,5,4,11,6 | - | - | - | - | - | - | - |
| 6 | - | - | 7 | 7 | 5 | - | - | 7 | 7 | - |

FIG. 7

FIG.10A $k_{ULHARQRTT}$ for TDD

| TDD UL/DL Configuration | subframe index $n$ | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG.10B $k1_{ULHARQRTT}$ for TDD

| TDD UL/DL Configuration | subframe index $n$ | | | | | | | | | |
|---|---|---|---|---|---|---|---|---|---|---|
| | 0 | 1 | 2 | 3 | 4 | 5 | 6 | 7 | 8 | 9 |
| 0 | | | 3 | 3 | 6 | | | 3 | 3 | 6 |
| 1 | | | 3 | 3 | | | | 3 | 3 | |
| 2 | | | 3 | | | | | 3 | | |
| 3 | | | 3 | 3 | 3 | | | | | |
| 4 | | | 3 | 3 | | | | | | |
| 5 | | | 3 | | | | | | | |
| 6 | | | 3 | 3 | 5 | | | 3 | 3 | |

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2017-055586 filed on Mar. 22, 2017, the contents of which are incorporated herein by reference.

BACKGROUND ART

The 3rd Generation Partnership Project (3GPP) has been studying a radio access method and a radio network for cellular mobile communications (referred to as "Long Term Evolution (LTE)", "Evolved Universal Terrestrial Radio Access (EUTRA)", "Evolved Universal Terrestrial Radio Access Network (EUTRAN)", and "New Radio"). A base station apparatus is also referred to as an evolved NodeB (eNodeB) or a gNodeB. A terminal apparatus is also referred to as a User Equipment (UE). In a cellular communication system, multiple areas are deployed in a cellular structure, with each of the multiple areas being covered by a base station apparatus. A single base station apparatus may manage a plurality of cells. In 3GPP, latency reduction enhancements have been studied. For example, as a solution for latency reduction, an effort has been started to reduce a processing time with respect to a legacy (1 ms) Transmission Time Interval (TTI) (NPL 1).

Hybrid Automatic Repeat reQuest (HARQ) functionality is provided in a Medium Access Control (MAC) layer. The HARQ functionality in a downlink is characterized by an asynchronous adaptive HARQ, and the HARQ functionality in an uplink is characterized by a synchronous HARQ (NPL 2). The 3GPP has been discussing introduction of an asynchronous HARQ in the uplink for a reduction in processing time, and an HARQ RTT timer (NPL 3).

CITATION LIST

Non Patent Literature

NPL 1: "Work Item on shortened TTI and processing time for LTE", RP-161299, Ericsson, 3GPP TSG RAN Meeting #72, Busan, Korea, Jun. 13 to 16, 2016.

NPL 2: "3GPP TS 36.300 v14.1.0 Evolved Universal Terrestrial Radio Access (E-UTRA) and Evolved Universal Terrestrial Radio Access Network (E-UTRAN); Overall description; Stage 2", December 2016.

NPL 3: "Protocol impacts of processing time reduction for legacy 1ms TTI", R2-1701318, Intel, 3GPP TSG RAN WG2 Meeting #97, Feb. 13 to 17, 2017.

SUMMARY OF INVENTION

Technical Problem

However, sufficient studies have not been made for measures for switching the RTT timer, which corresponds to a different length, by reducing the processing time.

An aspect of the present invention has been made in light of the foregoing, and an object of the present invention is to provide a terminal apparatus capable of efficiently communicating with a base station apparatus, an integrated circuit mounted in the terminal apparatus, a communication method used by the terminal apparatus, a base station apparatus for communicating with terminal apparatus, a communication method used by the base station apparatus, and an integrated circuit mounted in the base station apparatus.

Solution to Problem (1) To accomplish the object described above, aspects of the present invention are contrived to provide the following measures. Specifically, a first aspect of the present invention is a terminal apparatus including: a receiver configured to receive a PDCCH including a DCI format; and a transmitter configured to perform PUSCH transmission, based on detection of the PDCCH, wherein in an HARQ process corresponding to the PUSCH transmission, a value of an UL HARQ Round Trip Timer (RTT) timer for the HARQ process is provided based at least on a first condition and/or a second condition, wherein the first condition is that a search space for the PDCCH detected is either a common search space or a UE-specific search space, and the second condition is that a type of the HARQ process is either a synchronous HARQ or an asynchronous HARQ.

(2) A second aspect of the present invention is a terminal apparatus including: a receiver configured to receive a PDCCH including a DCI format; and a transmitter configured to perform, in a PUCCH, transmission of an HARQ-ACK in response to PDSCH reception, based on detection of the PDCCH, wherein in an HARQ process corresponding to the PDSCH reception, a value of an HARQ Round Trip Timer (RTT) timer for the HARQ process is provided based at least on a third condition, and the third condition is that a search space for the PDCCH detected is either a common search space or a UE-specific search space.

(3) A third aspect of the present invention is a communication method used by a terminal apparatus, the communication method including the steps of: receiving a PDCCH including a DCI format; and performing PUSCH transmission based on detection of the PDCCH, wherein in an HARQ process corresponding to the PUSCH transmission, a value of an UL HARQ Round Trip Timer (RTT) timer for the HARQ process is provided based at least on a first condition and/or a second condition, the first condition is that a search space for the PDCCH detected is either a common search space or a UE-specific search space, and the second condition is that a type of the HARQ process is either a synchronous HARQ or an asynchronous HARQ.

(4) A fourth aspect of the invention is a communication method used by a terminal apparatus, the communication method including the steps of: receiving a PDCCH including a DCI format; and performing, in a PUCCH, transmission of an HARQ-ACK in response to PDSCH reception, based on detection of the PDCCH, wherein in an HARQ process corresponding to the PDSCH reception, a value of an HARQ Round Trip Timer (RTT) timer for the HARQ process is provided based at least on a third condition, and the third condition is that a search space for the PDCCH detected is either a common search space or a UE-specific search space.

(5) A fifth aspect of the present invention is an integrated circuit mounted in a terminal apparatus, the integrated circuit including: a reception circuit configured to receive a PDCCH including a DCI format; and a transmission circuit configured to perform PUSCH transmission based on detection of the PDCCH, wherein in an HARQ process corresponding to the PUSCH transmission, a value of an UL HARQ Round Trip Timer (RTT) timer for the HARQ process is provided based at least on a first condition and/or a second condition, the first condition is that a search space for the PDCCH detected is either a common search space or a UE-specific search space, and the second condition is that a type of the HARQ process is either a synchronous HARQ or an asynchronous HARQ.

(6) A sixth aspect of the invention is an integrated circuit mounted in a terminal apparatus, the integrated circuit including: a reception circuit configured to receive a PDCCH including a DCI format; and a transmission circuit configured to perform, in a PUCCH, transmission of an HARQ-ACK in response to PDSCH reception, based on detection of the PDCCH, wherein in an HARQ process corresponding to the PDSCH reception, a value of an HARQ Round Trip Timer (RTT) timer for the HARQ process is provided based at least on a third condition, and the third condition is that a search space for the PDCCH detected is either a common search space or a UE-specific search space.

Advantageous Effects of Invention

According to an aspect of the present invention, a terminal apparatus can efficiently communicate with a base station apparatus.

BRIEF DESCRIPTION OF DRAWINGS

FIG. 4 is a table illustrating an example of a UL-DL configuration according to the present embodiment.

FIG. 7 is a diagram illustrating a correspondence between a subframe n-j to which a PDSCH is mapped and a subframe n in which an HARQ-ACK to which the PDSCH corresponds is transmitted, according to the present embodiment.

FIGS. 10A and 10B are examples, each illustrating a value of an UL HARQ RTT timer corresponding to an uplink HARQ process according to the present embodiment.

DESCRIPTION OF EMBODIMENTS

Embodiments of the present invention will be described below.

Figure 1:
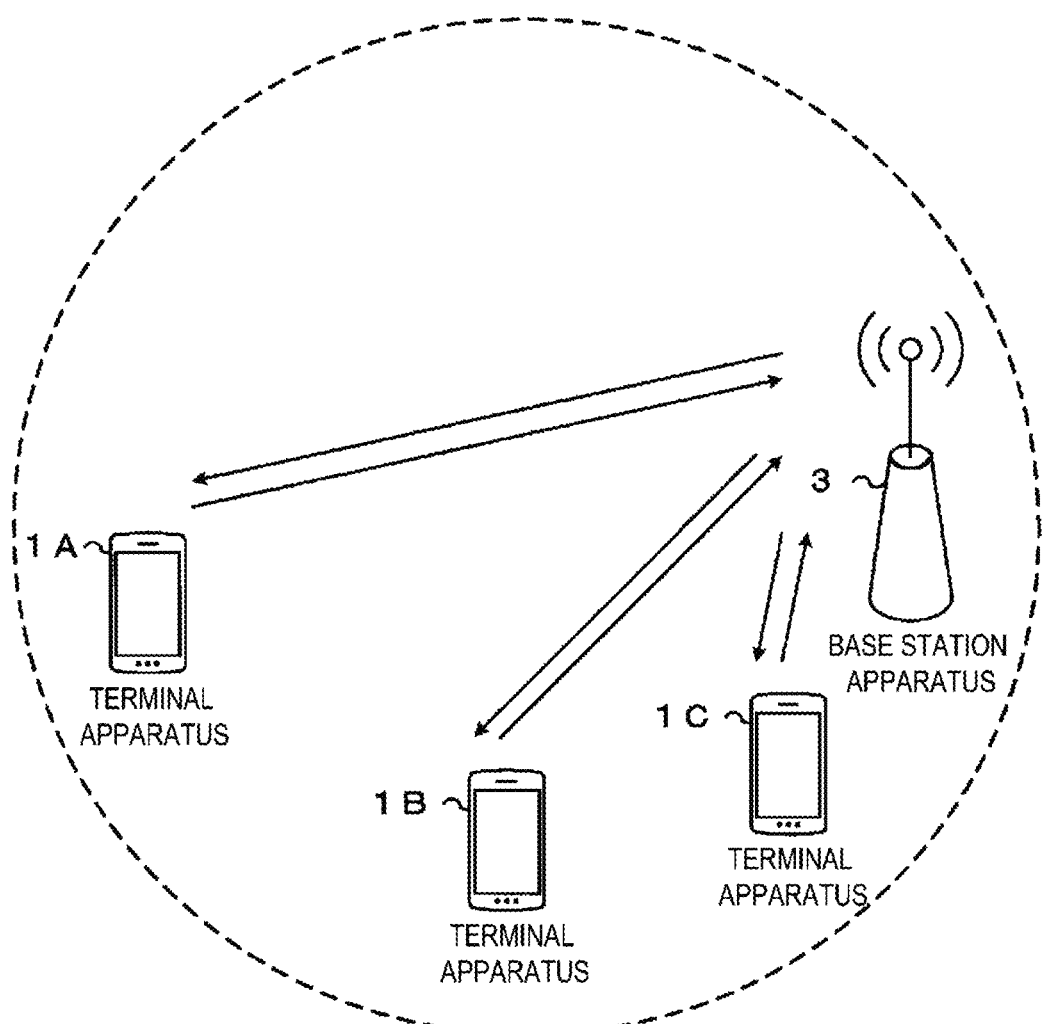
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are each referred to as a terminal apparatus 1.

Hereinafter, carrier aggregation will be described.

According to the present embodiment, at least one of multiple serving cells are configured for the terminal apparatus 1. A technology in which the terminal apparatus 1 communicates via the multiple serving cells is referred to as cell aggregation or carrier aggregation. An aspect of the present invention may be applied to each of the multiple serving cells configured for the terminal apparatus 1. Furthermore, an aspect of the present invention may be applied to some of the multiple serving cells configured. Furthermore, an aspect of the present invention may be applied to each of multiple serving cell groups configured. Furthermore, the present invention may be applied to some of the plurality of serving cell groups configured. The multiple serving cells include at least one primary cell. The multiple serving cells may include at least one or more secondary cells. The multiple serving cells may include one or more Licensed Assisted Access (LAA) cells.

Time Division Duplex (TDD), Frequency Division Duplex (FDD), and/or Licensed Assisted Access (LAA) is applied to a radio communication system according to the present embodiment. For cell aggregation, FDD may be applied to all the multiple serving cells. For cell aggregation, TDD may be applied to all the multiple serving cells. For cell aggregation, LAA may be applied to all the multiple serving cells. For cell aggregation, serving cells to which TDD is applied and serving cells to which FDD is applied may be aggregated. For cell aggregation, serving cells to which an LAA cell and FDD are applied may be aggregated. For cell aggregation, serving cells to which an LAA cell and TDD are applied may be aggregated.

The one or more serving cells configured include one primary cell and zero or more secondary cells. The primary cell is a cell in which an initial connection establishment procedure has been performed, a cell in which a connection re-establishment procedure has been initiated, or a cell indicated as a primary cell in a handover procedure. The secondary cell may be configured/added at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on a plurality of physical channels in a plurality of serving cells (component carriers). A single physical channel is transmitted in a single serving cell (component carrier) out of the plurality of serving cells (component carriers).

Figure 2:
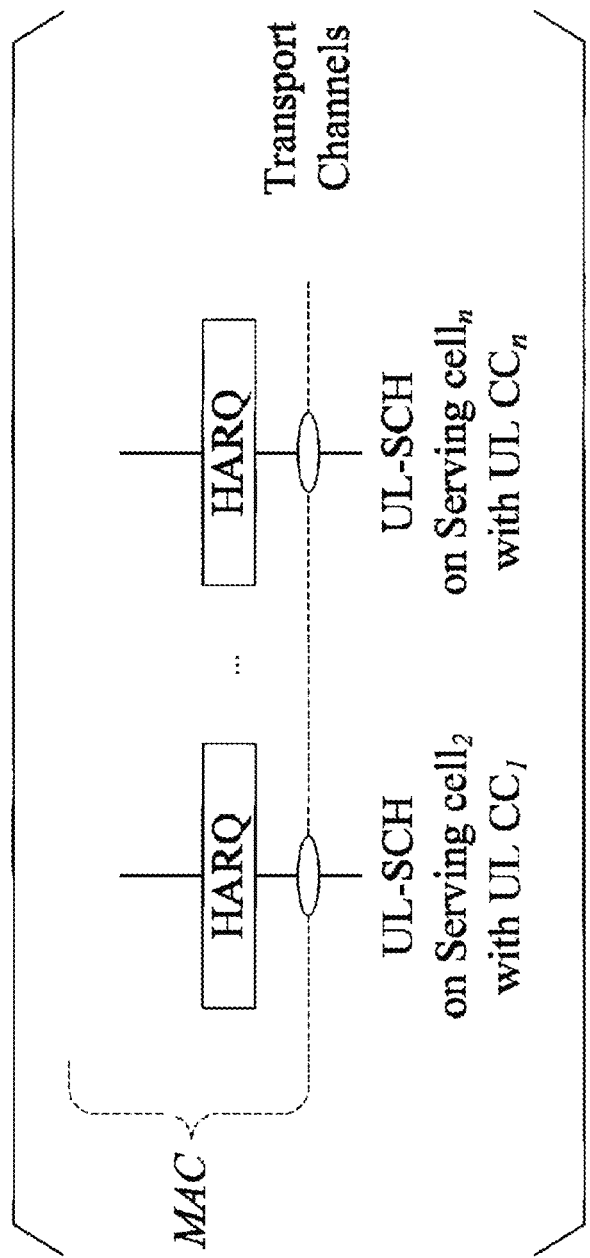
FIG. 2 is a diagram illustrating an example of a structure of a MAC layer for an uplink configured with carrier aggregation according to the present embodiment.

FIG. 2 is a diagram illustrating an example of a structure of a MAC layer for an uplink configured with carrier aggregation according to the present embodiment. In the uplink configured with carrier aggregation, one independent HARQ entity exists for each serving cell (uplink component carrier). The HARQ entity manages multiple HARQ processes in parallel. The HARQ process is associated with an HARQ buffer. That is, the HARQ entity is associated with multiple HARQ buffers. The HARQ process stores MAC layer data in the HARQ buffer. The HARQ process indicates to a physical layer to transmit the MAC layer data.

In the uplink configured with carrier aggregation, at least one transport block may be generated for each of Transmission Time Intervals (TTIs) for each serving cell. Each of the transport blocks and HARQ retransmission of the transport block are mapped to one serving cell. The TTI is also referred to as a subframe. The transport block is MAC layer data transmitted on an uplink shared channel (UL-SCH).

In the uplink according to the present embodiment, the "transport block", "MAC Protocol Data Unit (PDU)", "MAC layer data", "UL-SCH", "UL-SCH data", and "uplink data" are assumed to be the same.

Physical channels and physical signals according to the present embodiment will be described.

In uplink radio communication from the terminal apparatus 1 to the base station apparatus 3, the following uplink physical channels are used. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes: downlink Channel State Information (CSI); a Scheduling Request (SR) used to request a PUSCH (Uplink-Shared Channel: UL-SCH) resource for initial transmission; and a Hybrid Automatic Repeat request ACKnowledgement (HARQ-ACK) for downlink data (a Transport block, a Medium Access Control Protocol Data Unit (MAC PDU), a Downlink-Shared Channel (DL-SCH), or a Physical Downlink Shared Channel (PDSCH)). The HARQ-ACK indicates an acknowledgement (ACK) or a negative-acknowledgement (NACK). The HARQ-ACK is also referred to as ACK/NACK, HARQ feedback, HARQ acknowledge, or HARQ control information.

The scheduling request includes a positive scheduling request or a negative scheduling request. The positive scheduling request indicates to request a UL-SCH resource for initial transmission. The negative scheduling request indicates not to request the UL-SCH resource for the initial transmission.

The PUSCH is used for transmission of uplink data (Uplink-Shared Channel (UL-SCH)). Furthermore, the PUSCH may be used to transmit the HARQ-ACK and/or channel state information along with the uplink data. Furthermore, the PUSCH may be used to transmit only the channel state information. Furthermore, the PUSCH may be used to transmit only the HARQ-ACK and the channel state information.

Here, the base station apparatus 3 and the terminal apparatus 1 exchange (transmit and/or receive) signals with each other in their respective higher layers. For example, the base station apparatus 3 and the terminal apparatus 1 may transmit and/or receive RRC signaling in a Radio Resource Control (RRC) layer. The base station apparatus 3 and the terminal apparatus 1 may transmit and/or receive, in a Medium Access Control (MAC) layer, a MAC CE. Here, the RRC signaling and/or the MAC CE is also referred to as higher layer signaling. The RRC signaling and/or the MAC CE are/is included in a transport block.

In the present embodiment, "RRC signaling", "RRC layer information", "RRC layer signal" "RRC layer parameter", "RRC message", and "RRC information element" are assumed to mean the same thing.

The PUSCH is used to transmit the RRC signaling and the MAC CE. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, user device-specific (user device-unique) information is transmitted using the signaling dedicated to a certain terminal apparatus 1.

PRACH is used to transmit a random access preamble. The PRACH is used for indicating the initial connection establishment procedure, the handover procedure, the connection re-establishment procedure, synchronization (timing adjustment) for uplink transmission, and the request for the PUSCH (UL-SCH) resource.

The following uplink physical signal is used for uplink radio communication. The uplink physical signal is not used to transmit information output from the higher layer, but is used by a physical layer.

Uplink Reference Signal (UL RS)

The following downlink physical channels are used for downlink radio communication from the base station apparatus 3 to the terminal apparatus 1. The downlink physical channels are used for transmitting information output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB, a Broadcast Channel (BCH)) that is shared by the terminal apparatuses 1.

The PCFICH is used for transmission of information indicating a region (OFDM symbols) to be used for transmission of the PDCCH.

The PHICH is used for transmission of an HARQ indicator (HARQ feedback or response information) indicating an ACKnowledgement (ACK) or a Negative ACKnowledgement (NACK) for the uplink data (UpLink Shared Channel (UL-SCH)) received by the base station apparatus 3.

The PDCCH and the EPDCCH are used to transmit Downlink Control Information (DCI). In the present embodiment, the "PDCCH" is assumed to include the "EPDCCH" for the sake of convenience. The downlink control information is also referred to as a DCI format. The downlink control information transmitted on one PDCCH includes a downlink grant and HARQ information, or an uplink grant and HARQ information. The downlink grant is also referred to as a downlink assignment or a downlink allocation. The downlink assignment and the uplink grant are not transmitted together on one PDCCH. The downlink grant and the uplink grant may include HARQ information.

The downlink assignment is used for scheduling a single PDSCH within a single cell. The downlink assignment is used for scheduling the PDSCH within the same subframe as the subframe in which the downlink grant has been transmitted.

The uplink grant may be used for scheduling a single PUSCH within a single cell. The uplink grant may be used for scheduling a single PUSCH within a sequence of subframes succeeding the subframe in which the uplink grant has been transmitted.

The HARQ information may include a New Data Indicator (NDI) and information indicating a transport block size. The HARQ information transmitted on the PDCCH along with the downlink assignment also includes information indicating the number of the HARQ process in the downlink (downlink HARQ process Identifier/Identity, downlink HARQ process number). The HARQ information transmitted on the PDCCH with the uplink grant for the asynchronous HARQ may include information indicating the number of the HARQ process in the uplink (uplink HARQ process Identifier/Identity, uplink HARQ process number). The HARQ information transmitted on the PDCCH with the uplink grant for the synchronous HARQ need not include information indicating the number of the HARQ process in the uplink (uplink HARQ process Identifier/Identity, uplink HARQ process number).

The NDI indicates an initial transmission or retransmission. An HARQ entity indicates to a certain HARQ process to trigger the initial transmission in a case that the NDI provided by the HARQ information has been toggled relative to the value of the NDI for the transmission preceding the certain HARQ process. The HARQ entity indicates a certain HARQ process to trigger the retransmission in a case that the NDI provided by the HARQ information has not been toggled as compared to the value of the NDI for the transmission preceding the certain HARQ process. Note that the HARQ process may determine whether NDI has been toggled.

The HARQ entity identifies the HARQ process to which the uplink grant and the HARQ information correspond, and passes the uplink grant and the HARQ information to the identified HARQ process. The HARQ process stores the uplink grant and the HARQ information passed from the HARQ entity.

Cyclic Redundancy Check (CRC) parity bits added to the downlink control information transmitted on one PDCCH are scrambled with a Cell-Radio Network Temporary Identifier (C-RNTI), a Semi Persistent Scheduling (SPS) C-RNTI, or a Temporary C-RNTI. The C-RNTI and the SPS C-RNTI are identifiers for identifying a terminal apparatus within a cell. The Temporary C-RNTI serves as an identifier for identifying the terminal apparatus 1 that has transmitted a random access preamble in a contention based random access procedure.

The C-RNTI and the Temporary C-RNTI are used to control PDSCH transmission or PUSCH transmission in a single subframe. The SPS C-RNTI is used to periodically allocate a resource for the PDSCH or the PUSCH.

Hereinafter, unless otherwise specified, the CRC parity bits added to the downlink control information according to the present embodiment are scrambled with the C-RNTI.

The PDSCH is used to transmit downlink data (Downlink Shared Channel (DL-SCH)).

The PMCH is used to transmit multicast data (Multicast Channel (MCH)).

The following downlink physical signals are used in the downlink radio communication. The downlink physical signals are not used to transmit the information output from the higher layer, but are used by the physical layer.

Synchronization signal (SS)
Downlink Reference Signal (DL RS)

The synchronization signal is used for the terminal apparatus 1 to establish synchronization in a frequency domain and a time domain in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal apparatus 1 to perform channel compensation on a downlink physical channel. The downlink reference signal is used for the terminal apparatus 1 to obtain the downlink channel state information.

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Chanel State Information-Reference Signal (NZP CSI-RS)
Zero Power Chanel State Information-Reference Signal (ZP CSI-RS)
Multimedia Broadcast and Multicast Service over Single Frequency Network Reference signal (MBSFN RS)
Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as physical signals.

The BCH, the MCH, the UL-SCH, and the DL-SCH are transport channels. A channel used in the Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

A structure of a radio frame in the present embodiment will be described.

In the present embodiment, two radio frame structures are supported. The two radio frame structures are Frame structure Type 1 and Frame structure Type 2. Frame structure Type 1 is applicable to FDD. Frame structure Type 2 is applicable to TDD.

Figure 3:
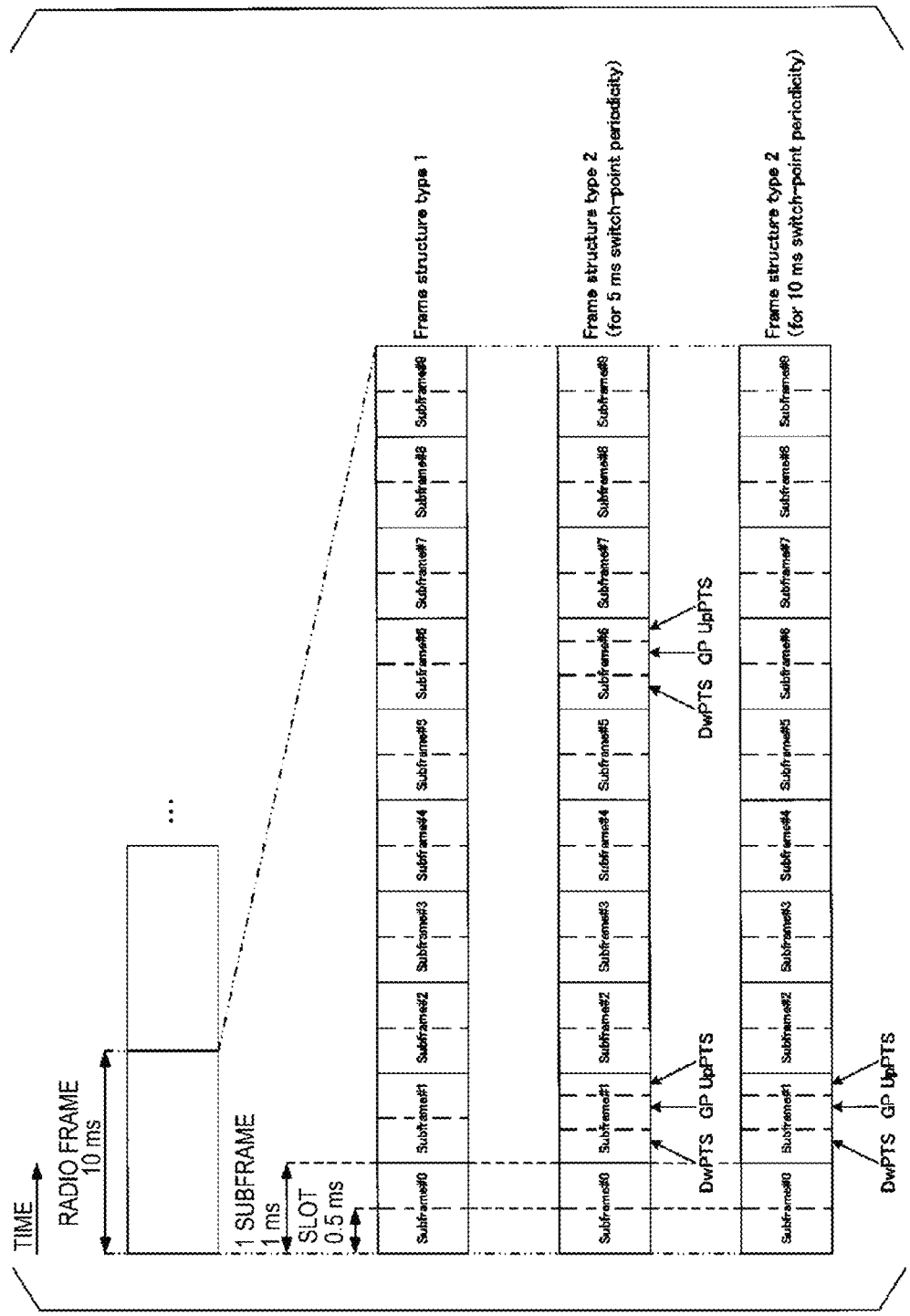
FIG. 3 is a diagram illustrating a schematic configuration of a radio frame according to the present embodiment.

FIG. 3 is a diagram illustrating a schematic configuration of a radio frame according to the present embodiment. In FIG. 3, the horizontal axis is a time axis. Each of radio frames of type 1 and type 2 is 10 ms in length, and is defined by 10 subframes. Each of the subframes is 1 ms in length and is defined by two consecutive slots. Each of the slots is 0.5 ms in length. The i-th subframe within a radio frame includes the (2×i)-th slot and the (2×i+1)-th slot.

Following three types of subframes are defined for Frame structure Type 2.

Downlink subframe

Uplink subframe

Special subframe

The downlink subframe is a subframe reserved for the downlink transmission. The uplink subframe is a subframe reserved for the uplink transmission. The special subframe includes three fields. The three fields are a Downlink Pilot Time Slot (DwPTS), a Guard Period (GP), and an Uplink Pilot Time Slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may include only the DwPTS and the GP, or may include only the GP and the UpPTS.

A radio frame of Frame structure Type 2 includes at least the downlink subframe, the uplink subframe, and the special subframe. The constitution of the radio frame of Frame structure Type 2 is indicated by an uplink-downlink configuration (UL-DL configuration). The terminal apparatus 1 receives information indicating the UL-DL configuration from the base station apparatus 3. FIG. 4 is a table illustrating an example of the UL-DL configuration according to the present embodiment. In FIG. 4, D denotes a downlink subframe, U denotes an uplink subframe, and S denotes a special subframe.

The number of symbols included in one subframe described above may be defined based on a Subcarrier Spacing for a physical channel used for transmission and/or reception. For example, in a case that the subcarrier spacing is 15 kHz, the number of symbols included in one subframe may be 14. Furthermore, in a case that the subcarrier interval is 30 kHz, the number of symbols included in one subframe may be 28. Here, the subcarrier spacing may be any of 3.75 kHz, 7.5 kHz, 15 kHz, 30 kHz, 60 kHz, 120 kHz, and 240 kHz. Obviously, a reduced subcarrier spacing increases a symbol length, and an increased subcarrier spacing reduces the symbol length. The symbol used for the uplink transmission is an OFDM (CP-OFDM, Cyclic Prefix-OFDM) symbol, or an SC-FDMA (DFT-S-OFDM) symbol. The symbol used for the downlink transmission is the OFDM symbol symbol. Furthermore, the subframe may include one or more slots.

A transmission timing of the HARQ-ACK for the downlink transmission (PDSCH) according to the present embodiment will be described.

For the transmission timing of the HARQ-ACK for the PDSCH, in a case that the terminal apparatus 1 detects the PDSCH in a subframe n-j for FDD, the terminal apparatus 1 transmits HARQ-ACK for the PDSCH in a subframe n. That is, the transmission timing of the HARQ-ACK for the PDSCH corresponds to the j-th succeeding subframe from the subframe in which the PDSCH has been transmitted.

Now, the transmission timing of the PUSCH for the uplink grant according to the present embodiment will be described.

For a transmission timing of the PUSCH for the uplink grant, in a case that the terminal apparatus 1 detects the PDCCH (uplink grant) in the subframe n for FDD, the terminal apparatus 1 transmits the PUSCH for the uplink grant in a subframe n+k. That is, the transmission timing of the PUSCH for the uplink grant corresponds to the k-th succeeding subframe from the subframe in which the uplink grant has been detected.

For the FDD, k and j may be 4. k and j that are each 4 may be referred to as normal timings (normal processing time). With the normal processing time, the transmission timing of the HARQ-ACK for the PDSCH and the transmission timing of the PUSCH for the uplink grant each correspond to four subframes.

Furthermore, the value of k and/or j may be a value smaller than 4. For example, the value of k and/or j may be 3. Furthermore, for example, the value of k and/or j may be 2. The value of k and/or j may be determined depending on the processing capability of the terminal apparatus 1. k and j that are each smaller than 4 may be referred to as a reduced timing (reduced processing time, short processing time). With the short processing time, the transmission timing of the HARQ-ACK for the PDSCH and the transmission timing of the PUSCH for the uplink grant correspond to fewer than four subframes. That is, a shortening processing capability of the terminal apparatus 1 is the capability of transmitting and/or receiving data by using the short processing time. Here, the value of k and/or j is defined by specifications or the like, and may be a value known to the base station apparatus 3 and the terminal apparatus 1.

Here, the processing capability of the terminal apparatus 1 may be indicated by capability information about the terminal apparatus 1. In the present embodiment, shortening capability information about the terminal apparatus 1 may be capability information about the terminal apparatus 1 associated with support (or non-support) of the capability of shortening the normal processing time. The terminal apparatus 1 with the shortening processing capability can transmit and/or receive data by using a processing time (short processing time) shorter than the normal processing time.

Regarding the capability information about the terminal apparatus 1, in a case that the base station apparatus 3 (EUTRAN) needs the capability information about the terminal apparatus 1, a procedure for the terminal apparatus 1 in a connected mode (that is, the terminal apparatus 1 for which an RRC connection is established) is initiated. The base station apparatus 3 queries the capability information (e.g., the shortening processing capability) about the terminal apparatus 1. The terminal apparatus 1 transmits the capability information about the terminal apparatus 1 to the base station apparatus 3 in response to the query. The base station apparatus 3 determines whether the terminal apparatus 1 supports to the capability information, and in a case that the terminal apparatus 1 supports the capability information, transmits configuration information corresponding to the capability information to the terminal apparatus 1 by using higher layer signaling or the like. The configuration information corresponding to the capability information is configured, and the terminal apparatus 1 determines whether to base transmission and/or reception on the capability or not. For example, the configuration information corresponding to the shortening processing capability may be defined as an RRC layer parameter reducedProcessingTiming. The terminal apparatus 1 configured with the RRC layer parameter reducedProcessingTiming may transmit and/or receive data by using the short processing time. Furthermore, the terminal apparatus 1 not configured with the RRC layer parameter reducedProcessingTiming may transmit and/or receive data using the normal processing time.

The RRC layer parameter reducedProcessingTiming is a parameter indicating whether or not to perform data transmission and/or reception based on the short processing time in a certain serving cell. Here, configuration of the RRC parameter reducedProcessingTiming indicates that the value of the parameter reducedProcessingTiming transmitted by the higher layer signaling is True. A reducedProcessingTiming parameter configured with a value True may also include that transmission and/or reception is to be performed using the short processing time (e.g., 3 ms). A lack of configuration of the RRC reducedProcessingTiming parameter may indicate that the value of the parameter reducedProcessingTiming transmitted by the higher layer signaling is False, or that the received higher layer signaling (higher layer information) does not include the RRC parameter reducedProcessingTiming. A reducedProcessingTiming parameter configured with a value False may also include that transmission and/or reception is to be performed using the normal processing time (e.g., 4 ms).

Note that the RRC parameter reducedProcessingTiming may be defined for the serving cell. That is, the base station apparatus 3 may transmit (notify), to the terminal apparatus 1, information about whether or not the RRC parameter reducedProcessingTiming is configured for each serving cell. A terminal apparatus 1 configured with the RRC parameter reducedProcessingTiming for a certain serving cell may perform transmission and/or reception by using the short processing time (e.g., 3 ms) in the serving cell. A terminal apparatus 1 not configured with the RRC parameter reducedProcessingTiming for the certain serving cell may perform transmission and/or reception by using the normal processing time in the serving cell. Whether to configure the RRC parameter reducedProcessingTiming is optional for higher layer (RRC).

Here, the serving cell includes component carriers used for the downlink and component carriers used for the uplink. Linking may be defined between the uplink component carriers and the downlink component carriers. The RRC parameter reducedProcessingTiming may be applied to both the uplink component carriers and the downlink component carriers included in the same linking. The terminal apparatus 1 may identify the serving cell for the uplink grant (serving cell in which transmission on the PUSCH scheduled by the uplink grant (uplink transmission) is performed) based on the linking between the uplink and the downlink. With the same linking, no carrier indicator field is present in the downlink assignment or the uplink grant. Furthermore, in a case that the downlink assignment or the uplink grant in the serving cell configured with the RRC parameter reducedProcessingTiming includes the carrier indicator field to schedule transmission and/or reception in another serving cell not configured with the RRC parameter reducedProcessingTiming, transmission and/or reception may be performed using the normal processing time.

As described above, the terminal apparatus 1 configured with the RRC parameter reducedProcessingTiming for a certain serving cell may perform transmission and/or reception in the serving cell by using the short processing time (e.g., 3 ms). However, in a case that the downlink assignment or the uplink grant in the serving cell is detected in a common search space, the terminal apparatus 1 may perform transmission and/or reception by using the normal processing time. In other words, in a case that the downlink assignment or the uplink grant in the serving cell is detected in a UE-specific search space, the terminal apparatus 1 may perform transmission and/or reception by using the short processing time.

Note that the RRC parameter reducedProcessingTiming may be defined independently for the uplink component carriers and for the downlink component carriers. In other words, the RRC parameter reducedProcessingTiming may be defined for each of the downlink and the uplink. That is, the base station apparatus 3 may transmit (notify), to the terminal apparatus 1, information about whether the RRC parameter reducedProcessingTiming is configured for each uplink component carrier. Furthermore, the base station apparatus 3 may transmit (notify), to the terminal apparatus 1, information about whether or not the RRC parameter reducedProcessingTiming is configured for each downlink component carrier. For example, a terminal apparatus 1 configured with the RRC parameter reducedProcessingTiming for a certain uplink component carrier may transmit the PUSCH by using the short processing time (e.g., 3 ms) for the uplink component carrier. The terminal apparatus 1 not configured with the RRC parameter reducedProcessingTiming for the certain uplink component carrier may transmit the PUSCH by using the normal processing time for the uplink component carrier. Furthermore, for example, a terminal apparatus 1 configured with the RRC parameter reducedProcessingTiming for the certain downlink component carrier may transmit the HARQ-ACK for the PDSCH in the downlink component carrier by using the short processing time. The terminal apparatus 1 not configured with the RRC parameter reducedProcessingTiming for the certain downlink component carrier may transmit the HARQ-ACK for the PDSCH in the downlink component carrier by using the normal processing time.

Note that the RRC parameter reducedProcessingTiming may be defined for each of Timing Advance Groups (TAGs). The base station apparatus 3 may transmit (notify), to the terminal apparatus 1, information about whether the RRC parameter reducedProcessingTiming is configured for each TAG. The configuration related to the RRC parameter reducedProcessingTiming may be applied to each of the serving cells belonging to the same Timing Advance Group (TAG). For example, the terminal apparatus 1 configured with the RRC parameter reducedProcessingTiming for a certain TAG may perform transmission and/or reception by using the short processing time in a serving cell belonging to the TAG. The terminal apparatus 1 not configured with the RRC parameter reducedProcessingTiming for the certain TAG may perform transmission and/or reception by using the normal processing time in the serving cell belonging to the TAG.

The HARQ process in the uplink includes the synchronous HARQ and the asynchronous HARQ. Hereinafter, the synchronous HARQ in the uplink will be described.

In the synchronous HARQ, the HARQ process to which the uplink grant corresponds is associated with a subframe in which the uplink grant has been received and/or a subframe in which PUSCH (UL-SCH) corresponding to the uplink grant is transmitted. In the synchronous HARQ, the terminal apparatus 1 derives the HARQ process to which the uplink grant corresponds from the subframe in which the uplink grant has been received and/or the subframe in which PUSCH (UL-SCH) corresponding to the uplink grant is transmitted. That is, in the synchronous HARQ, the HARQ entity may identify the HARQ process to which the uplink grant corresponds without using the information included in the uplink grant.

Figure 5:
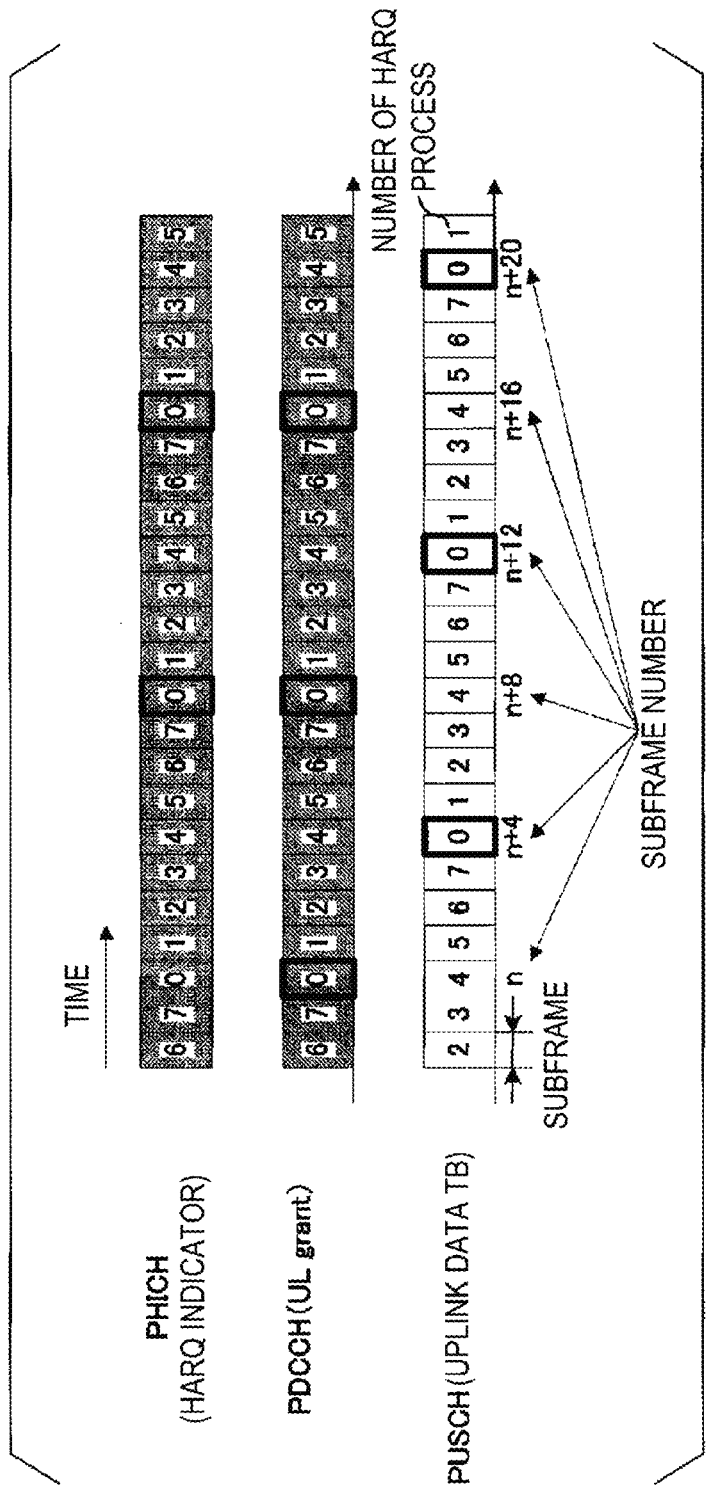
FIG. 5 is a diagram illustrating an example of an uplink synchronous HARQ according to the present embodiment.

FIG. 5 illustrates an example of an uplink synchronous HARQ according to the present embodiment. In FIG. 5, one subframe corresponds to one HARQ process. In FIG. 5, numbers in rectangles indicate the numbers of corresponding HARQ processes. In the synchronous HARQ, the HARQ entity derives the HARQ process from a subframe in which UL-SCH data in the MAC layer is transmitted or a subframe in which a DCI format 0 corresponding to the UL-SCH data in the MAC layer has been detected.

In FIG. 5, the subframe in which the MAC layer data corresponding to the uplink grant is transmitted is derived from the subframe in which the uplink grant has been received. For example, the UL-SCH data in the MAC layer corresponding to the uplink grant may be transmitted on the PUSCH in the fourth succeeding subframe from the subframe in which the uplink grant has been received.

In synchronous HARQ, the HARQ indicator is transmitted on the PHICH in response to an uplink transmission. The correspondence between the subframe in which the uplink transmission has been performed and the subframe in which the corresponding PHICH is transmitted is predetermined. For example, the HARQ indicator for the MAC layer data is transmitted on the PHICH in the fourth succeeding subframe from the subframe in which the MAC layer data has been transmitted on the PUSCH. Furthermore, for example, the MAC layer data is retransmitted on the PUSCH in the fourth succeeding subframe from the subframe in which the NACK has been received on the PHICH.

Hereinafter, the asynchronous HARQ in the uplink will be described.

Figure 6:
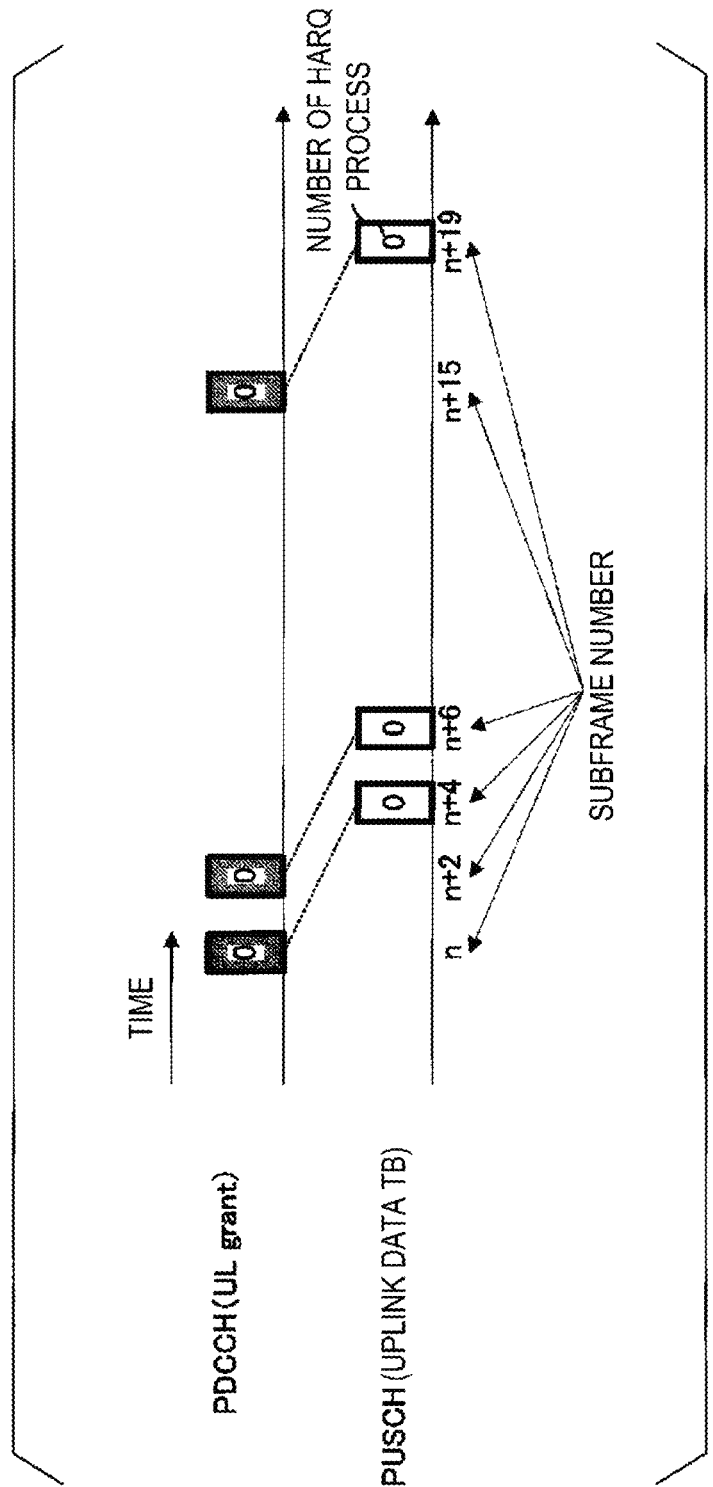
FIG. 6 is a diagram illustrating an example of an uplink asynchronous HARQ according to the present embodiment.

FIG. 6 is a diagram illustrating an example of an uplink asynchronous HARQ according to the present embodiment. In FIG. 6, one subframe corresponds to one HARQ process. In FIG. 6, numbers in rectangles indicate the number of corresponding HARQ processes. In the asynchronous HARQ, in a case that the uplink grant is included in the PDCCH mapped to a UE-specific search space, the HARQ entity derives the HARQ process from an "HARQ process number" field. In the asynchronous HARQ, in a case that the uplink grant is included in the PDCCH mapped to the common search space, the HARQ entity may use an HARQ process with a specific number. In the asynchronous HARQ, in a case that the uplink grant is included in a random access response, the HARQ entity may use HARQ process with a specific number. The specific number may be 0. The specific number may be a predetermined number.

In the asynchronous HARQ, the HARQ indicator is not transmitted on the PHICH in response to the uplink transmission. That is, in the asynchronous HARQ, retransmissions of the MAC layer data are always scheduled via the PDCCH. In FIG. 6, the subframe in which the MAC layer data corresponding to the uplink grant is transmitted is derived from the subframe in which the uplink grant has been received. For example, with the normal processing time, the MAC layer data corresponding to the uplink grant may be transmitted on the PUSCH in the fourth succeeding subframe from the subframe in which the uplink grant has been received. With the short processing time, MAC layer data corresponding to the uplink grant may be transmitted on the PUSCH in a subframe three subframes after the subframe in which the uplink grant has been received.

Hereinafter, the asynchronous HARQ in the downlink will be described.

Figure 8:
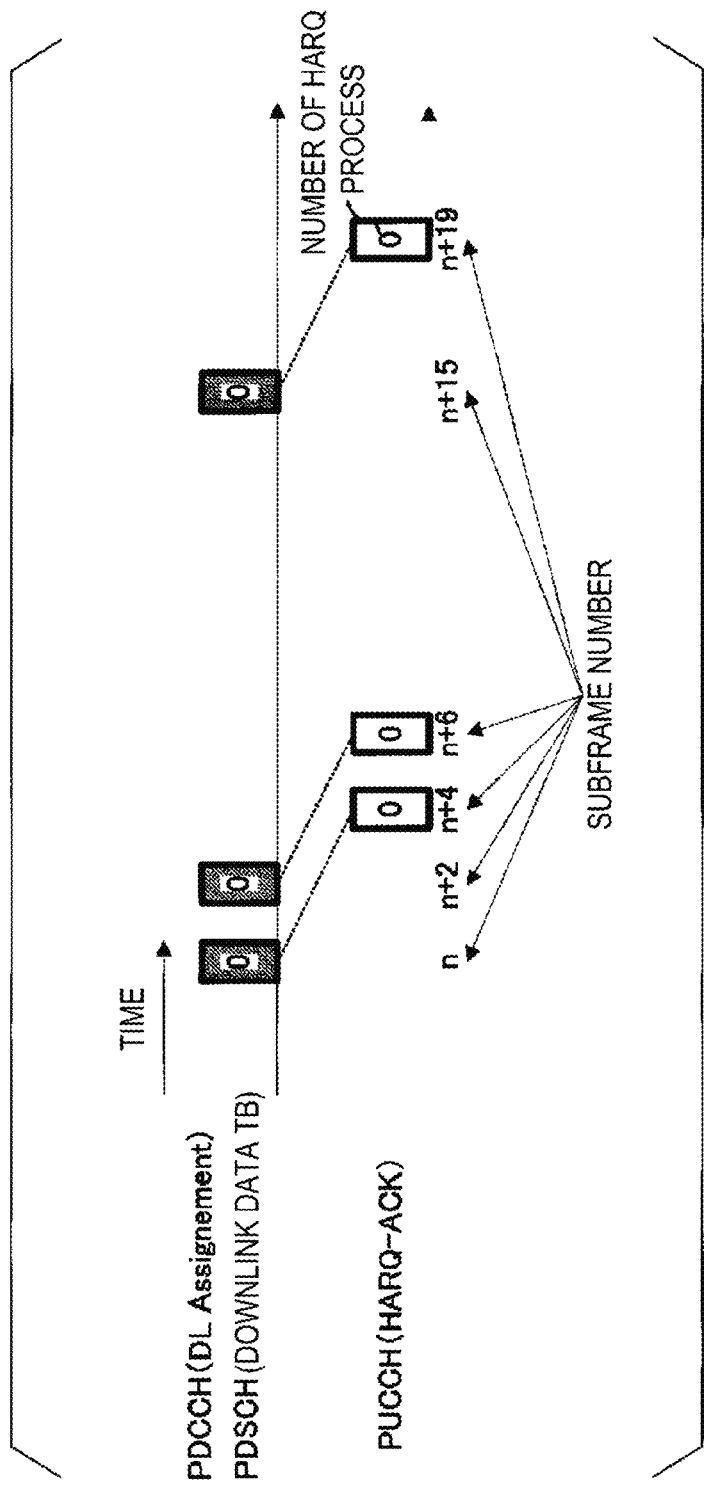
FIG. 8 is a diagram illustrating an example of a downlink asynchronous HARQ according to the present embodiment.

FIG. 8 is a diagram illustrating an example of a downlink asynchronous HARQ according to the present embodiment. In FIG. 8, one subframe corresponds to one HARQ process. In FIG. 8, numbers in rectangles indicate the numbers of corresponding HARQ processes. In the downlink asynchronous HARQ, the HARQ entity derives the HARQ process from the "HARQ process number" field included in the downlink assignment.

In FIG. 8, a subframe in which the HARQ-ACK for the PDSCH corresponding to the downlink assignment is transmitted is derived from a subframe in which the downlink assignment has been received. For example, with the normal processing time, the HARQ-ACK for the PDSCH may be transmitted on the PUCCH in the fourth succeeding subframe from the subframe in which the PDSCH corresponding to the downlink assignment has been received. With the short processing time, the HARQ-ACK for the PDSCH may be transmitted on the PUSCH in the third succeeding subframe from the subframe in which the PDSCH corresponding to the downlink assignment has been received.

In the present embodiment, the HARQ process manages a state variables HARQ_FEEDBACK. The HARQ process indicates to the physical layer to generate a transmission in response to the uplink grant in a case that the HARQ entity requests a non-adaptive retransmission and the NACK is set in the state variable HARQ_FEEDBACK.

The HARQ process to which the synchronous HARQ is applied sets the ACK or the NACK in the state variable HARQ_FEEDBACK based on the HARQ indicator received on the PHICH. The HARQ process to which the asynchronous HARQ is applied need not set the ACK or the NACK in the state variable HARQ_FEEDBACK, based on the HARQ indicator received on the PHICH.

The HARQ process to which the synchronous HARQ is applied sets the NACK in the state variable HARQ_FEEDBACK, based on the initial transmission from the HARQ entity or a request for adaptive retransmission. Furthermore, the HARQ process to which the asynchronous HARQ is applied sets the ACK in the state variable HARQ_FEEDBACK, based on the initial transmission from the HARQ entity or the request for adaptive retransmission. Note that an adaptive retransmission is a retransmission indicated by the NDI and a non-adaptive retransmission is a retransmission indicated by the HARQ indicator. This prevents the HARQ process to which the asynchronous HARQ is applied from performing the non-adaptive retransmission.

Now, a Discontinuous Reception (DRX) applicable to the present invention will be described.

A DRX functionality is configured by a higher layer (RRC) and processed through MAC. The DRX functionality controls a PDCCH monitoring activity of the terminal apparatus 1 for the C-RNTI and the SPS C-RNTI of the terminal apparatus 1.

In other words, the DRX functionality controls the monitoring activity of the terminal apparatus 1 for the PDCCH to be used to transmit a DCI format, to which the SPS C-RNTI of the terminal apparatus 1 or CRC parity bits scrambled with the C-RNTI are added.

In an RRC_CONNECTED state, with the DRX configured, the terminal apparatus 1 may discontinuously monitor the PDCCHs through a DRX operation to be described below. In other cases, the terminal apparatus 1 may continuously monitor PDCCHs.

Monitoring of the PDCCH will be described below.

Here, monitoring means an attempt to decode the PDCCH in accordance with a certain DCI format. The PDCCH is transmitted on a PDCCH candidate. The terminal apparatus 1 monitors a set of PDCCH candidates in the serving cell. The set of PDCCH candidates is referred to as a search space. The search space includes at least a Common Search Space (CSS) and a UE-specific Search Space (USS). The UE-specific search space is derived at least from the value of the C-RNTI set by the terminal apparatus 1. That is, the UE-specific search space is separately derived for each terminal apparatus 1. The common search space is a search space common to the multiple terminal apparatuses 1, and is constituted by a Control Channel Element (CCE) with a predetermined index. The CCE includes multiple resource elements.

The DRX operation is common to multiple serving cells.

The higher layer (RRC) controls the DRX operation by configuring the following multiple timers and a drxStart- Offset value. Whether to configure a drxShortCycleTimer and a shortDRX-Cycle is optional for the higher layer (RRC).
 onDurationTimer
 drx-InactivityTimer
 drx-RetransmissionTimer (one for each of downlink HARQ processes except for a downlink HARQ process corresponding to a broadcast process)
 drx-ULRetransmissionTimer (one for each of the uplink HARQ processes)
 longDRX-Cycle
 HARQ Round Trip Time (RTT) timer (one for each downlink HARQ process)
 UL HARQ RTT timer (one for each uplink HARQ process)
 drxShortCycleTimer
 shortDRX-Cycle The base station apparatus 3 may transmit, to the terminal apparatus 1, an RRC message including parameters/information indicating the values of onDurationTimer, drx-InactivityTimer, drx-RetransmissionTimer, drx-ULRetransmissionTimer, longDRX-Cycle, drxShortCycleTimer, shortDRX-Cycle, and drxStartOffset.

The terminal apparatus 1 may set the values of onDurationTimer, drx-InactivityTimer, drx-RetransmissionTimer, drx-ULRetransmissionTimer, longDRX-Cycle, drxShortCycleTimer, shortDRX-Cycle, and drxStartOffset, based on the received RRC message.

longDRX-Cycle and shortDRX-Cycle are also collectively referred to as a DRX cycle.

onDurationTimer indicates the number of consecutive PDCCH subframes from the start of a DRX cycle.

drx-InactivityTimer indicates the number of consecutive PDCCH subframes subsequent to the subframe, to which the PDCCH indicating initial transmission of uplink data or downlink data to the terminal apparatus 1 is mapped.

drx-RetransmissionTimer indicates the maximum number of consecutive PDCCH subframes for downlink retransmission expected by the terminal apparatus 1. The same value of drx-RetransmissionTimer is applied to all serving cells.

drx-ULRetransmissionTimer indicates the maximum number of consecutive PDCCH subframes for uplink retransmission expected by the terminal apparatus 1. In other words, the drx-ULRetransmissionTimer indicates the maximum number of consecutive PDCCH subframes until the uplink grant for uplink retransmission (uplink HARQ retransmission grant) is received. The same drx-ULRetransmissionTimer value is applied to all the serving cells to which the asynchronous HARQ is applied in the uplink. For a terminal apparatus 1 with the shortening processing capability, drx-ULRetransmissionTimer may also be applied to the uplink synchronous HARQ. Furthermore, in a case that the RRC parameter reducedProcessingTiming for a certain serving cell is configured for a terminal apparatus 1 with the shortening processing capability, the drx-ULRetransmissionTimer may also be applied to the uplink synchronous HARQ process in the serving cell. In a case that the RRC parameter reducedProcessingTiming for the certain serving cell is not configured for a terminal apparatus 1 with the shortening processing capability, the drx-ULRetransmissionTimer need not be applied to the uplink synchronous HARQ process in the serving cell. For the terminal apparatus 1 with no shortening processing capability, drx-ULRetransmissionTimer need not be applied to the uplink synchronous HARQ.

The HARQ RTT timer is associated with the start of the drx-RetransmissionTimer and is managed for each downlink HARQ process. The HARQ RTT timer corresponding to a downlink HARQ process indicates the minimum interval from transmission of downlink data to retransmission of the downlink data. In other words, the HARQ RTT timer corresponding to the downlink HARQ process indicates the minimum amount of subframes before the terminal apparatus 1 expects a MAC entity to retransmit the downlink HARQ.

For each serving cell, in a case of FDD, the HARQ RTT timer is configured (set) to eight subframes. Note that a terminal apparatus 1 not configured with the RRC parameter reducedProcessingTiming for a certain serving cell may configure (set) the HARQ RTT timer to eight subframes for the serving cell.

A terminal apparatus 1 configured with the RRC parameter reducedProcessingTiming for the certain serving cell may configure (set) the HARQ RTT timer to six subframes for the serving cell. However, in a case that the downlink assignment scheduling the downlink data is received in the common search space, the HARQ RTT timer may be configured (set) to eight subframes. In other words, in a case that the downlink assignment scheduling downlink data is received in the UE-specific search space, the HARQ RTT timer may be configured (set) to six subframes.

For each serving cell, in a case of TDD, the HARQ RTT timer is configured (set) to j+4 subframes; wherein, k is the interval between the downlink transmission and the HARQ feedback corresponding to the downlink transmission, and is specified (selected or determined) in accordance with the UL-DL configuration and/or the normal processing time. Note that the terminal apparatus 1 not configured with the RRC parameter reducedProcessingTiming for the certain serving cell may configure (set) the HARQ RTT timer to j+4 subframes in the serving cell. Here, j denotes a correspondence between a subframe n-j to which the PDSCH is mapped and a subframe n in which the HARQ-ACK to which the PDSCH corresponds is transmitted. The value of j may be acquired from FIG. 7. FIG. 7 is a diagram illustrating the correspondence between the subframe n-j to which the PDSCH is mapped and subframe n in which the HARQ-ACK to which the PDSCH corresponds is transmitted, according to the present embodiment. The terminal apparatus 1 specifies (selects or determines) the value of k in accordance with the table in FIG. 7.

The terminal apparatus 1 configured with the RRC parameter reducedProcessingTiming for a certain serving cell may configure (set) the HARQ RTT timer to j1+3 subframes for the serving cell. j1 is the interval between the downlink transmission and the HARQ feedback associated with the downlink transmission, and is specified (selected or determined) in accordance with the UL-DL configuration and the short processing time. Here, the value of j1 may be similar to the value of j or may be a value smaller than the value of j. The value of j1 may be defined as a new table in the specifications. However, in a case that the downlink assignment scheduling downlink data is received in the common search space, the HARQ RTT timer may be configured (set) to j+4 subframes. In other words, in a case that the downlink assignment scheduling the downlink data is received in the UE-specific search space, the HARQ RTT timer may be configured (set) to j1+3 subframes.

That is, for FDD and/or TDD, in a certain serving cell, the HARQ RTT timer for the downlink HARQ process may be provided based at least on (1) the type of the search space in which the downlink assignment scheduling the downlink data is transmitted and/or (2) whether or not the RRC parameter reducedProcessingTiming is configured.

For TDD, whether the method by which the HARQ RTT timer for the downlink HARQ process is provided for a certain serving cell is a first method or a second method may be determined based at least on (1) the type of the search space in which the downlink assignment scheduling the downlink data is transmitted and/or (2) whether or not the RRC parameter reducedProcessingTiming is configured. Here, the first method for providing the HARQ RTT timer is to base on a first table indicating the correspondence between the subframe n-j to which the PDSCH is mapped and the subframe n in which the HARQ-ACK to which the PDSCH corresponds is transmitted. Furthermore, the second method for providing the HARQ RTT timer is to base on a second table indicating the correspondence between a subframe n-j1 to which the PDSCH is mapped and the subframe n in which the HARQ-ACK to which the PDSCH corresponds is transmitted.

The UL HARQ RTT timer is associated with the start of the drx-RetransmissionTimer and is managed for each uplink HARQ process. The UL HARQ RTT timer corresponding to the uplink HARQ process indicates the minimum interval from transmission of uplink data to transmission of the uplink grant (uplink HARQ retransmission grant) for retransmission of the uplink data. In other words, the UL HARQ RTT timer corresponding to the uplink HARQ process indicates the minimum amount of subframes before the terminal apparatus 1 expects the uplink grant for the uplink retransmission (uplink HARQ retransmission grant). The UL HARQ RTT timer may be defined for each uplink asynchronous HARQ process. Furthermore, for the terminal apparatus 1 with the shortening processing capability, the UL HARQ RTT timer may be defined for each uplink synchronous HARQ process. Furthermore, in a case that the RRC parameter reducedProcessingTiming for a certain serving cell is configured for a terminal apparatus 1 with the shortening processing capability, the UL HARQ RTT timer may also be defined for each uplink synchronous HARQ process in the serving cell. In a case that the RRC parameter reducedProcessingTiming for a certain serving cell is not configured for a terminal apparatus 1 having the shortening processing capability, the UL HARQ RTT timer may not be defined (configured) for the uplink synchronous HARQ process in the serving cell. The UL HARQ RTT timer may not be defined (configured) for the uplink synchronous HARQ process for a terminal apparatus 1 not having a shortening processing capability.

For each serving cell, in a case of FDD, the UL HARQ RTT timer corresponding to the uplink HARQ process is set to four subframes. Note that the terminal apparatus 1 not configured with the RRC parameter reducedProcessingTiming for a certain serving cell may configure (set) the UL HARQ RTT timer to four subframes for the serving cell.

The terminal apparatus 1 configured with the RRC parameter reducedProcessingTiming for the certain serving cell may configure (set) the HARQ RTT timer to three subframes for the serving cell.

However, in a case that the uplink grant scheduling the uplink data is received in the common search space, the UL HARQ RTT timer may be configured (set) to four subframes. In other words, in a case that the uplink grant scheduling the uplink data is received in the UE-specific search space, the UL HARQ RTT timer may be configured (set) to three subframes. That is, the UL HARQ RTT timer for the uplink HARQ process may be provided based on the type of the search space in which the uplink grant corresponding to the uplink HARQ process has been received.

Furthermore, in the serving cell configured with the RRC parameter reducedProcessingTiming, the UL HARQ RTT timer for the uplink HARQ process may be provided based on the type of uplink HARQ process. For example, in a case that the uplink HARQ process is indicated in the uplink synchronous HARQ, the UL HARQ RTT timer for the uplink HARQ process may be configured (set) to four subframes. Note that in a case that the uplink HARQ process is indicated in the uplink asynchronous HARQ, the UL HARQ RTT timer for the uplink HARQ process may be configured (set) to three subframes.

For each serving cell, in a case of TDD, the UL HARQ RTT timer corresponding to the uplink HARQ process is configured (set) for $k_{ULHARQRTT}$ subframes. The value of $k_{ULHARQRTT}$ is identified (selected or determined) in accordance with the UL-DL setting and/or the normal processing time. For example, the value of $k_{ULHARQRTT}$ may be acquired from FIG. 10A. Note that a terminal apparatus 1 not configured with the RRC parameter reducedProcessingTiming for a certain serving cell may configure (set) the UL HARQ RTT timer to $k_{ULHARQRTT}$ subframe for the serving cell. FIGS. 10A and 10B are an example illustrating a value of an UL HARQ RTT timer corresponding to an uplink HARQ process according to the present embodiment.

Furthermore, a terminal apparatus 1 configured with the RRC parameter reducedProcessingTiming for a certain serving cell may configure (set) the UL HARQ RTT timers to $k1_{ULHARQRTT}$ subframes for the serving cell. The value of $k1_{ULHARQRTT}$ is identified (selected or determined) in accordance with the UL-DL configuration and/or the short processing time. For example, the value of $k1_{ULHARQRTT}$ may be acquired from FIG. 10B. However, in a case that the uplink grant scheduling the transmission of the uplink data is received in the common search space, the UL HARQ RTT timer may be configured (set) to $k_{ULHARQRTT}$ subframe subframes. In other words, in a case that the uplink grant scheduling the uplink data is received in the UE-specific search space, the UL HARQ RTT timer may be configured (set) to $k1_{ULHARQRTT}$ subframes. That is, the UL HARQ RTT timer for the uplink HARQ process may be provided based on the type of the search space in which the uplink grant corresponding to the uplink HARQ process has been received.

As described above, in a serving cell configured with the RRC parameter reducedProcessingTiming, the UL HARQ RTT timer for the uplink HARQ process may be provided based on the type of uplink HARQ process. For TDD, in a case that the uplink HARQ process is indicated in the uplink HARQ process, the UL HARQ RTT timer for the uplink HARQ process may be configured (set) to $k_{ULHARQRTT}$ subframes. Note that in a case that the uplink HARQ process is indicated in the uplink asynchronous HARQ, the UL HARQ RTT timer for the uplink HARQ process may be configured (set) to $k1_{ULHARQRTT}$ subframes.

In the present embodiment, whether the synchronous HARQ or the asynchronous HARQ is applied to the uplink HARQ process in a certain serving cell may be derived based on whether the RRC layer parameter reducedProcessingTiming is configured for the serving cell or not. In a serving cell not configured with the RRC layer parameter reducedProcessingTiming, the uplink HARQ process may be a synchronous HARQ process. In a serving cell configured with the RRC layer parameter reducedProcessingTiming, the uplink HARQ process may be an asynchronous HARQ process. Furthermore, whether the synchronous HARQ or the asynchronous HARQ is applied to the uplink HARQ process in the serving cell configured with the RRC layer parameter reducedProcessingTiming may be derived from the type of the search space in which the uplink grant has been received. For example, in a case that the uplink grant corresponding to the uplink HARQ process is received in the common search space, the type of uplink HARQ process may be the synchronous HARQ. Furthermore, in a case that the uplink grant corresponding to the uplink HARQ process is received in the UE-specific search space, the type of the uplink HARQ process may be the asynchronous HARQ. Furthermore, for example, whether the synchronous HARQ or the asynchronous HARQ is applied to the uplink HARQ process in the serving cell configured with the RRC layer parameter reducedProcessingTiming may be derived based on whether the number of the uplink HARQ process is indicated by the uplink grant. For example, in a case that the number of the uplink HARQ process is provided by a field included in the uplink grant, the type of the uplink HARQ process may be asynchronous HARQ. In a case that the number of the uplink HARQ process is not provided by the uplink grant, the type of uplink HARQ process may be synchronous HARQ.

The DRX cycle indicates an On Duration iteration cycle. An on-duration period is followed by a period in which a PDCCH monitoring inactivity of the terminal apparatus 1 for a C-RNTI and an SPS C-RNTI of the terminal apparatus 1 is enabled.

Figure 9:
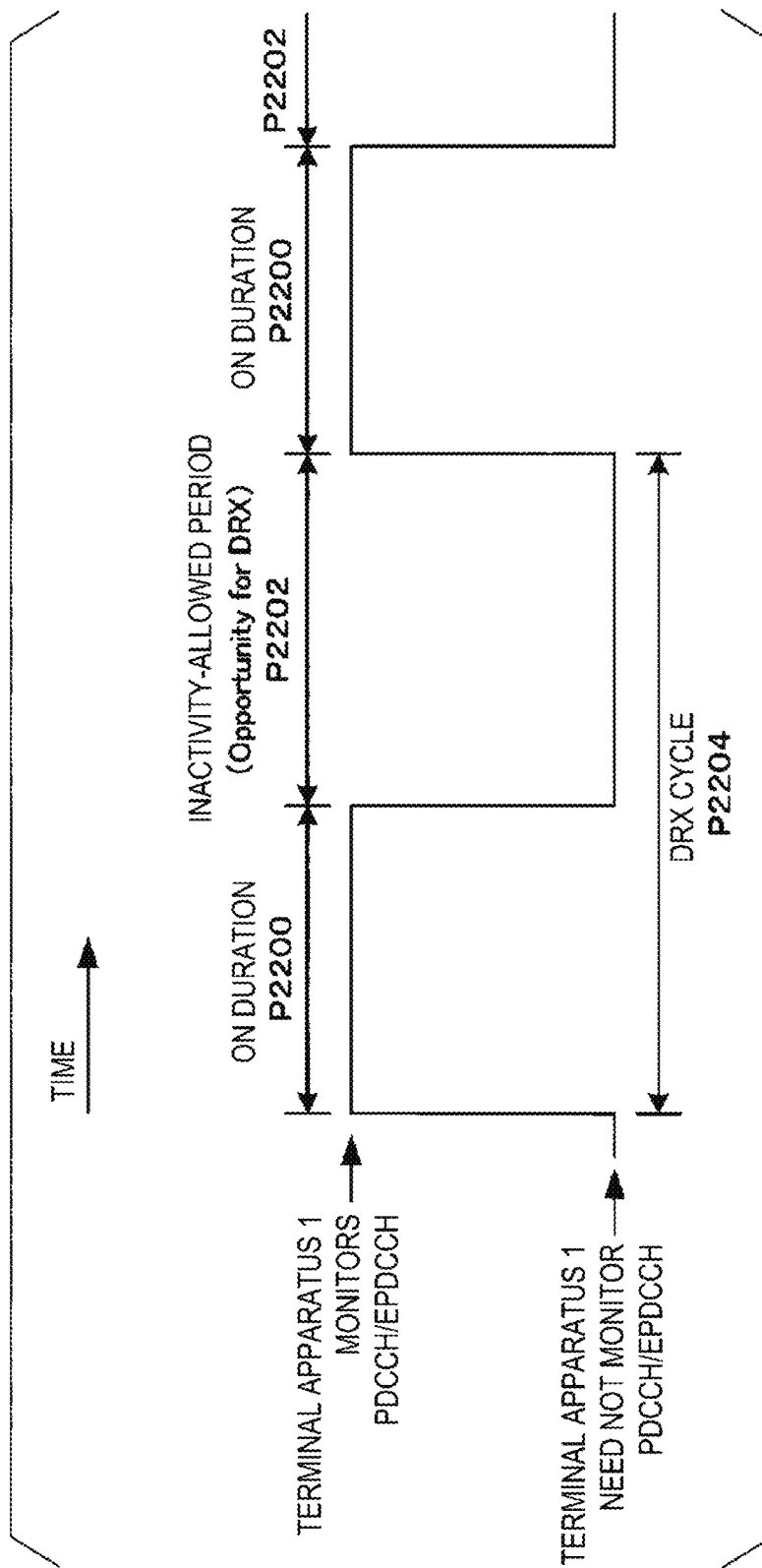
FIG. 9 is a diagram illustrating an example of a DRX cycle according to the present embodiment.

FIG. 9 is a diagram illustrating an example of the DRX cycle according to the present embodiment. In FIG. 9, the horizontal axis is a time axis. In FIG. 9, the terminal apparatus 1 monitors the PDCCH/EPDCCH in an on-duration period P2200. In FIG. 9, a period P2202 subsequent to the on-duration period P2200 is a period when inactivity is enabled. In other words, in FIG. 9, the terminal apparatus 1 need not monitor the PDCCH/EPDCCH during the period P2202.

drxShortCycleTimer indicates the number of consecutive subframes in which the terminal apparatus 1 follows a short DRX cycle.

drxStartOffset indicates a subframe in which the DRX cycle starts.

In a case that the DRX cycle is configured, an Active Time includes a period satisfying at least one of the following conditions (i) to (l) below.

Condition (e): onDurationTimer, drx-InactivityTimer, drx-RetransmissionTimer, drx-ULRetransmission-Timer, or mac-ContentionResolutionTimer is running Condition (j): a scheduling request is transmitted on the PUCCH and is pending Condition (k): for the synchronous HARQ, the uplink grant for pending HARQ retransmission may be transmitted, and data is present in the corresponding HARQ buffer.

Condition (l): after successful reception of a random access response for a preamble not selected by the terminal apparatus 1, the C-RNTI of the terminal apparatus 1 is obtained, and the PDCCH indicating that initial transmission has not long been received Once a timer starts, the timer keeps running until the timer is stopped or the timer expires. In other cases, the timer is not running. In a case that the timer is not running, the timer has a possibility to be started. In a case that the timer is running, the timer has a possibility to be restarted. The timer is always to be started or restarted from an initial value of the timer.

The preamble serves as a message 1 in a random access procedure, and is transmitted on a PRACH. The preamble that is not selected by the terminal apparatus 1 relates to a contention-based random access procedure.

The random access response serves as a message 2 in the random access procedure, and is transmitted on a PDSCH. The base station apparatus 3 transmits a random access response to the received preamble.

The terminal apparatus 1 performing the contention-based random access procedure receives the random access response, and then transmits a message 3. After transmitting the message 3, the terminal apparatus 1 monitors a PDCCH relating to a message 4.

mac-ContentionResolutionTimer indicates the number of consecutive subframes in which the terminal apparatus 1 monitors the PDCCH after the transmission of the message 3.

Note that the same active time is applied to all the activated serving cells. The primary cell is always activated. The secondary cell is activated or deactivated by MAC. The base station apparatus 3 transmits, to the terminal apparatus 1, a MAC CE indicating activation or deactivation of the secondary cell.

The terminal apparatus 1 need not monitor the PDCCH in any deactivated serving cell. The terminal apparatus 1 need not monitor the PDCCH for the deactivated serving cell.

Figure 11:
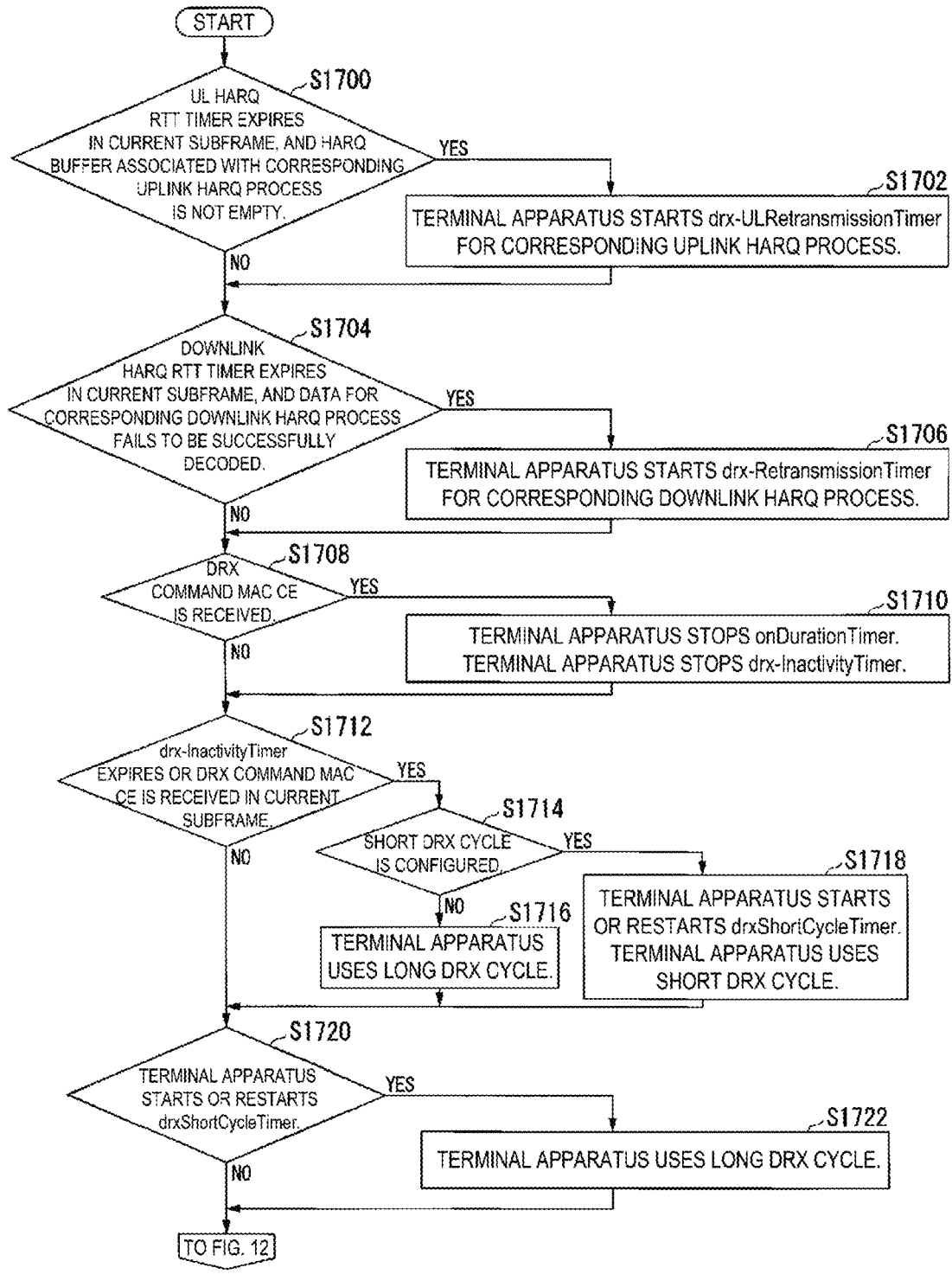
FIG. 11 is a flowchart illustrating an example of a DRX operation according to the present embodiment.
Figure 12:
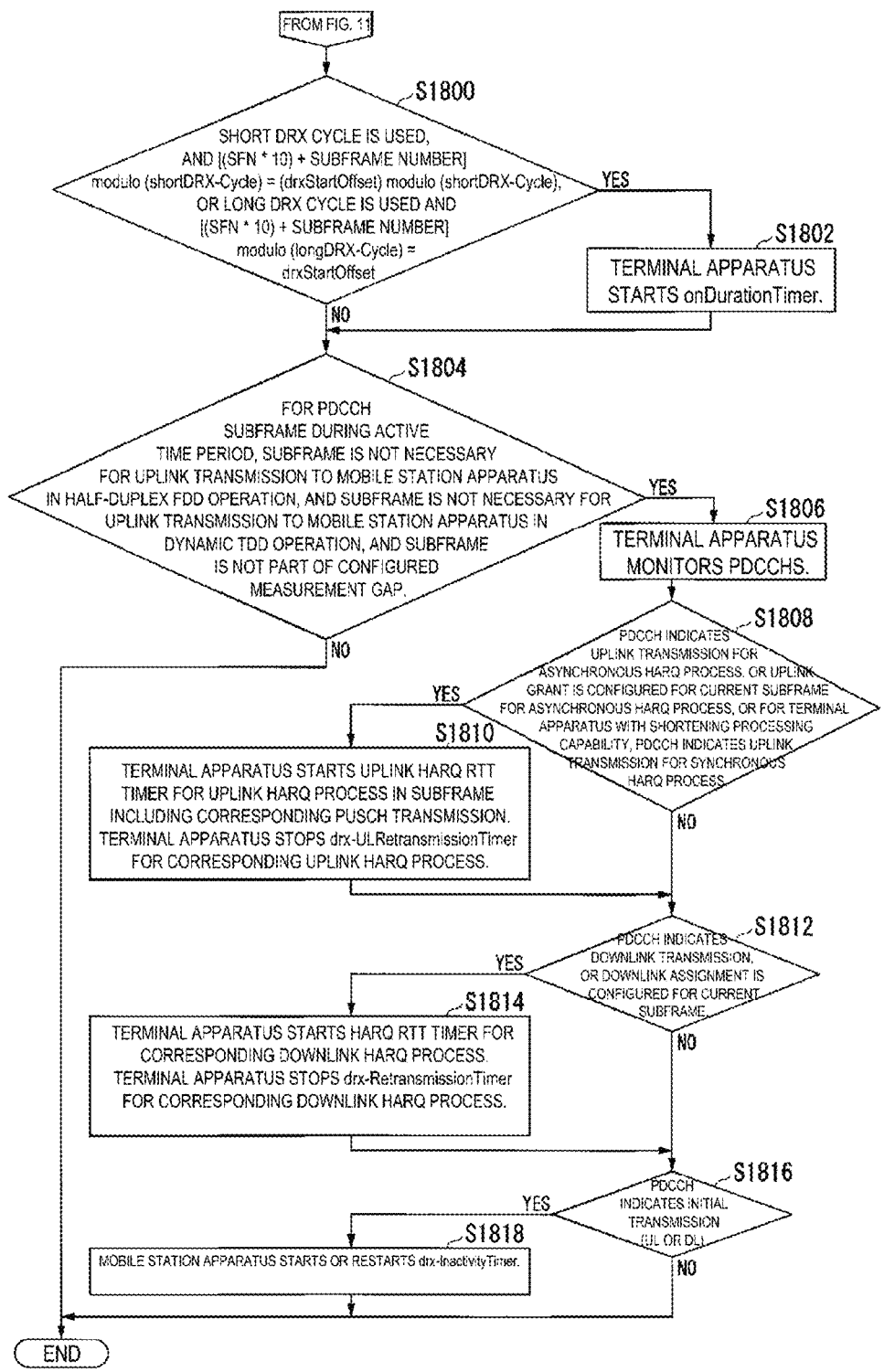
FIG. 12 is a flowchart illustrating an example of a DRX operation according to the present embodiment.

FIG. 11 and FIG. 12 are flowcharts illustrating an example of a DRX operation according to the present embodiment. In a case that the DRX is configured, the terminal apparatus 1 performs the DRX operation on each of the subframes based on the flowcharts in FIG. 11 and FIG. 12.

In a case that the UL HARQ RTT timer corresponding to the uplink HARQ process in the current subframe expires and data is present in the HARQ buffer associated with the HARQ process corresponding to the UL HARQ RTT timer (S1700), the terminal apparatus 1 starts the drx-ULRetransmissionTimer for the uplink HARQ process corresponding to the UL HARQ RTT timer (S1702) and processing proceeds to S1704. In other cases, the terminal apparatus 1 proceeds to S1704. Note that the other cases may include skipping of the condition (S1700).

In a case that the HARQ RTT timer corresponding to the downlink HARQ process expires in the current subframe and the data of the HARQ process corresponding to the HARQ RTT timer is not decoded successfully (S1704), the terminal apparatus 1 starts the drx-RetransmissionTimer for the downlink HARQ process corresponding to the HARQ RTT timer (S1706) and processing proceeds to S1708. In other cases, the terminal apparatus 1 proceeds to S1708. Note that the other cases may include skipping of the condition (S1704).

In a case that a DRX command MAC CE is received (S1708), the terminal apparatus 1 stops the onDurationTimer and the drx-InactivityTimer (S1710), and processing proceeds to S1712. In other cases, the terminal apparatus 1 proceeds to S1712. Note that the other cases may include skipping of the condition (S1708).

In a case that the drx-InactivityTimer expires or the DRX command MAC CE is received in the current subframe (S1712), the terminal apparatus 1 proceeds to S1714. In other cases, the terminal apparatus 1 proceeds to S1720. Note that the other cases may include skipping of the condition (S1712).

In a case that a shortDRX-Cycle is not configured (S1714), the terminal apparatus 1 uses a long DRX cycle (S1716), and proceeds to S1720. In a case that the shortDRX-Cycle is configured (S1714), the terminal apparatus 1 starts or restarts the drxShortCycleTimer to use the short DRX-Cycle (S1718) and proceeds to S1720.

In a case that the drxShortCycleTimer expires in the current subframe (S1720), the terminal apparatus 1 uses the long DRX cycle (S1722) and proceeds to S1800 in FIG. 12. In other cases (S1720), the terminal apparatus 1 proceeds to S1800 in FIG. 12. Note that the other cases may include skipping of the condition (S1720).

(1) In a case that the short DRX-Cycle is used and [(SFN*10)+subframe number] modulo (shortDRX-Cycle)= (drxStartOffset) modulo (shortDRX-Cycle), or (2) in a case that the long DRX-Cycle is used and [(SFN*10)+subframe number] modulo (longDRX-Cycle)=drxStartOffset (S1800), the terminal apparatus 1 starts the onDurationTimer (S1802) and proceeds to S1804. Otherwise (S1800), the terminal apparatus 1 proceeds to S1804.

In a case that all of the following conditions (m) to (p) are satisfied (S1804), the terminal apparatus 1 monitors the PDCCH in the current subframe (1806) and proceeds to S1808.

Condition (m): the current subframe is included in an Active Time period

Condition (n): the current subframe is a PDCCH subframe

Condition (o): the current subframe is not necessary for uplink transmission to the terminal apparatus 1 with a half-duplex FDD operation Condition (p): the current subframe is not a part of a configured measurement gap In a half-duplex FDD serving cell, the terminal apparatus 1 is not capable of simultaneously performing uplink transmission and downlink reception. The terminal apparatus 1 may transmit, to the base station apparatus 3, information indicating whether to support half-duplex FDD in an FDD band.

The measurement gap is a time interval for the terminal apparatus 1 to perform measurements of cells operating on different frequencies and/or operating in different Radio Access Technologies (RATs). The base station apparatus 3 transmits information indicating the period of the measurement gap to the terminal apparatus 1. The terminal apparatus 1 configures the period of the measurement gap, based on the information.

In a case that at least one of the conditions (m) to (p) fails to be satisfied (S1804), the terminal apparatus 1 terminates the DRX operation for the current subframe. In other words, in a case that at least one of the conditions (m) to (p) fails to be satisfied, the terminal apparatus 1 need not monitor the PDCCH in the current subframe.

Note that the conditions used in S1804 are not limited to the condition (m) to the condition (p) and that, in S1804, conditions different from the condition (m) to (p) or some of the conditions (m) to (p) may be used.

In a case that the uplink grant received via the PDCCH indicates uplink transmission for the asynchronous HARQ process, or a case that the uplink grant is configured for the asynchronous HARQ process for the subframe, or for a terminal apparatus 1 with the shortening processing capability, if the uplink grant received via the PDCCH indicates uplink transmission for the synchronous HARQ process (S1808), the terminal apparatus 1: (i) starts the UL HARQ RTT timer for the uplink HARQ process corresponding to the uplink grant in a subframe including PUSCH transmission corresponding to the uplink grant, (ii) stops the drx-ULRetransmissionTimer for the uplink HARQ process corresponding to the uplink grant (S1810), and then (iii) proceeds to step S1812. Otherwise (S1808), the terminal apparatus 1 proceeds to S1812.

Furthermore, the state with the uplink grant configured may mean a state in which semi persistent scheduling is activated by the uplink grant including the SPS C-RNTI.

In a case that the downlink assignment received via the PDCCH indicates downlink transmission, or in a case that the downlink assignment is configured for the current subframe (S1812), the terminal apparatus 1 starts the HARQ RTT timer for the corresponding downlink HARQ process and stops the drx-RetransmissionTimer for the corresponding downlink HARQ process (S1814). Otherwise (S1812), the terminal apparatus 1 proceeds to S1816.

The state in which a downlink assignment is configured denotes a state in which semi persistent scheduling is activated by the downlink assignment along with an SPS C-RNTI.

In a case that the downlink assignment or the uplink grant received via the PDCCH indicates an initial transmission in the downlink or in the uplink (S1816), the terminal apparatus 1 starts or restarts the drx-InactivityTimer (1818) and terminates the DRX operation for the current subframe. Otherwise (S1816), the terminal apparatus 1 terminates the DRX operation for the current subframe.

Note that the terminal apparatus 1 configured with the DRX transmits no periodic SRS in a case that the current subframe is not in the Active Time period.

The base station apparatus 3 may transmit to the terminal apparatus 1 information indicating to the terminal apparatus 1 to perform setup or release of CQI-masking.

A terminal apparatus 1 configured with the DRX and for which the CQI masking (cqi-Mask) is not set up by the higher layer does not transmit the CSI via the PUCCH in a case where the current subframe is not in the Active Time period. A terminal apparatus 1 configured with the DRX and for which the CQI masking (cqi-Mask) is set up by the higher layer does not transmit the CSI via the PUCCH in a case where the onDurationTimer is not running.

The PDCCH subframe according to the present invention will now be described.

In the present embodiment, for an FDD serving cell, all subframes are PDCCH subframes. In the present embodiment, the terminal apparatus 1 and the base station apparatus 3 identify a PDCCH subframe for a TDD serving cell based on the UL-DL configuration.

In the present embodiment, for half-duplex TDD, the base station apparatus 3 and the terminal apparatus 1 communicating with the base station apparatus 3 by using one primary cell identify (select or determine), as a PDCCH subframe, a subframe indicated as a downlink subframe or a subframe including DwPTS in the UL-DL configuration corresponding to the primary cell.

In a case of performing the TDD operation using one primary cell, the terminal apparatus 1 is not capable of simultaneously performing transmission and reception. In other words, the TDD operation performed using only one primary cell is half-duplex TDD.

In the present embodiment, for half-duplex TDD, the base station apparatus 3 and the terminal apparatus 1 communicating with the base station apparatus 3 by using multiple serving cells including one primary cell and one or more secondary cells identify, as a PDCCH subframe, a subframe indicated by the UL-DL configuration corresponding to the primary cell, as a downlink subframe or a subframe including DwPTS.

In the present embodiment, for full-duplex TDD, the base station apparatus 3 and the terminal apparatus 1 communicating with the base station apparatus 3 using multiple serving cells including one primary cell and one or multiple secondary cells excludes, in a case that a parameter (schedulingCellId) indicating which serving cell sends a downlink allocation for an associated secondary cell, secondary cells configured with the parameter (schedulingCellId), and identifies, as a PDCCH subframe, a subset (union) of subframes indicated by the UL-DL configuration corresponding to the multiple serving cells, as a downlink subframe or a subframe including DwPTS.

In a case that none of the secondary cells are configured with the parameter (schedulingCellId) indicating which serving cell sends a downlink allocation for an associated secondary cell included, the processing for excluding the secondary cells configured with the parameter (schedulingCellId) need not be performed.

The uplink grant will be described below.

DCI format 0 is the uplink grant and is used for scheduling of the PUSCH. DCI Format 0 does not include the "Redundancy version" field and the "HARQ process number" field. Furthermore, DCI format 0D is the uplink grant and is used for scheduling of the PUSCH. DCI format 0D includes the "Redundancy version" field and the "HARQ process number" field. Here, DCI format 0D may be used for scheduling of the PUSCH in a serving cell configured with the short processing time. The uplink grant includes DCI format 0 and DCI format 0D.

A terminal apparatus 1 not configured with the RRC layer parameter reducedProcessingTiming for the serving cell may decode the PDCCH including DCI format 0 in the common search space and the UE-specific search space in the serving cell. A terminal apparatus 1 not configured with the RRC layer parameter reducedProcessingTiming for the serving cell may not decode the PDCCH including DCI format 0D in the UE-specific search space in the serving cell. DCI format 0 may be used for the uplink synchronous HARQ. A terminal apparatus 1 configured with the RRC layer parameter reducedProcessingTiming for the serving cell may decode the PDCCH including DCI format 0 in the common search space in the serving cell and decode the PDCCH including DCI format 0D in the UE-specific search space in the serving cell. A terminal apparatus 1 configured with the RRC layer parameter reducedProcessingTiming for the serving cell need not decode the PDCCH including DCI format 0 in the UE-specific search space in the serving cell. DCI format 0D may be used for the uplink asynchronous HARQ. DCI format 0D is not used for the uplink synchronous HARQ. The number of the uplink HARQ process is provided by the "HARQ process number" field included in DCI format 0D. For FDD, the terminal apparatus 1 may transmit the PUSCH in the third succeeding subframe from the subframe in which the PDCCH has been decoded, based on decoding of the PDCCH including DCI format 0D in the UE-specific search space. Furthermore, based on decoding of the PDCCH including DCI format 0 in the common search space, the terminal apparatus 1 may transmit the PUSCH in the fourth succeeding subframe from the subframe in which the PDCCH has been decoded.

Figure 15:
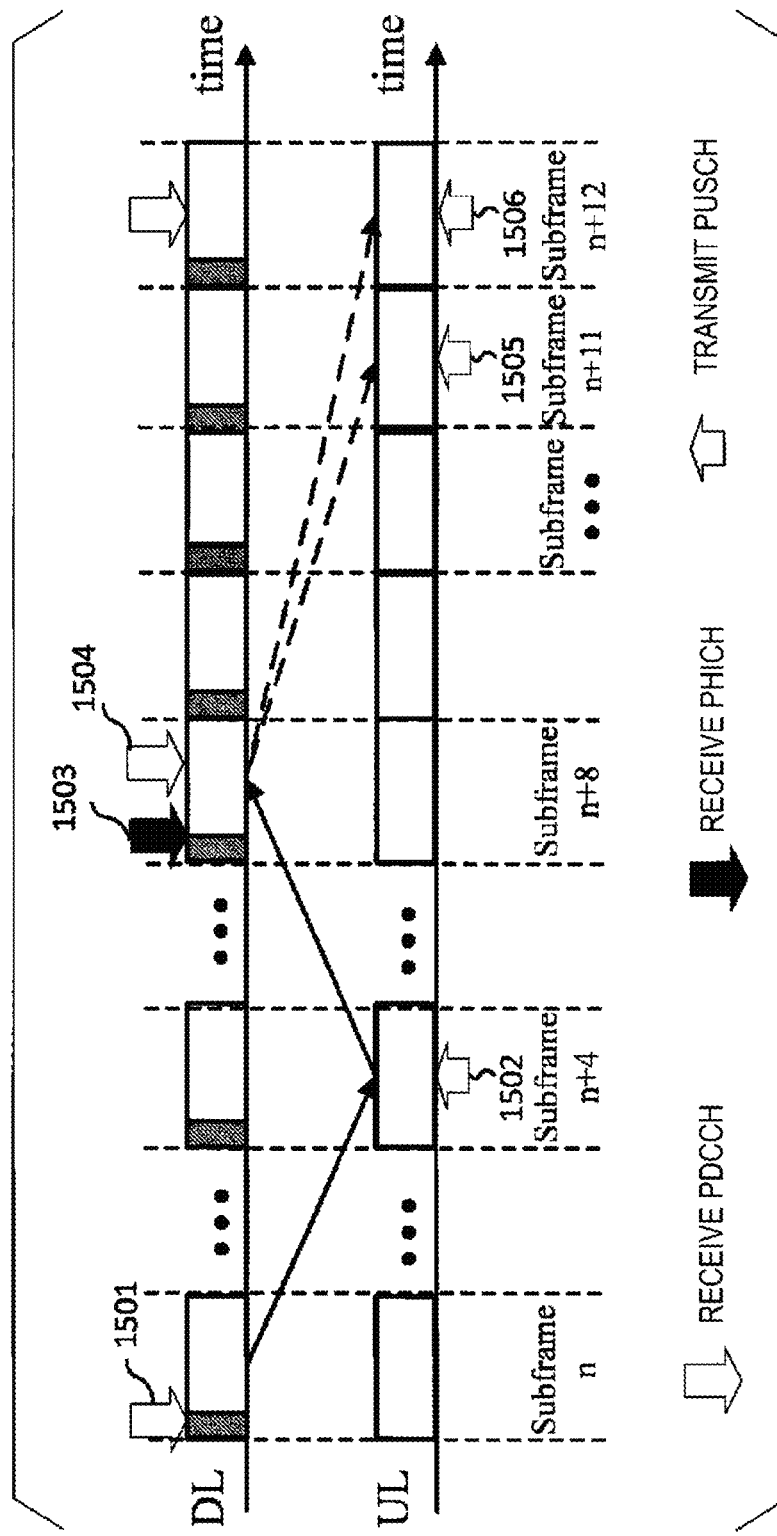
FIG. 15 is a diagram illustrating an example of reception of a PHICH and a PDCCH in the same subframe.

FIG. 15 is a diagram illustrating an example of reception of the PHICH and the PDCCH in the same subframe. In FIG. 15, the serving cell is configured with the RRC layer parameter reducedProcessingTiming. The terminal apparatus 1 decodes the PDCCH (1501) including DCI format 0 in the common search space in the subframe n, and transmits the PUSCH (1502) in a subframe n+4. Subsequently, the terminal apparatus 1 decodes (detects) the HARQ indicator responding to the PUSCH transmission (1502) on the PHICH (1503) in a subframe n+8. Furthermore, the terminal apparatus 1 may attempt to decode the PDCCH (1504) including the uplink grant in the subframe n+8. That is, the terminal apparatus 1 may decode the PHICH and one uplink grant in the same subframe.

In a case of receiving the ACK on the PHICH (1503), the terminal apparatus 1 may attempt to decode the PDCCH including the uplink grant in the common search space and the UE-specific search space in the subframe n+8. In other words, the terminal apparatus 1 may decode DCI format 0 in the common search space. The terminal apparatus 1 may decode DCI format 0D in the UE-specific search space. Here, the HARQ process number indicated in the "HARQ process number" field included in DCI format 0D may be the same as or different from the number of the HARQ process for the PUSCH (1502). A DCI format 0D indicating the same number as that of the HARQ process for the PUSCH (1502) may be used for retransmission of the PUSCH (1502). A DCI format 0D indicating a number different from the number of the HARQ process for the PUSCH (1502) is not used for retransmission of the PUSCH (1502). A DCI format 0D indicating a number different from the number of the HARQ process for the PUSCH (1502) may be used for the initial transmission of the PUSCH. The terminal apparatus 1 transmits the PUSCH, based on the decoded PDCCH.

In a case of receiving the NACK on the PHICH (1503), the terminal apparatus 1 may decode DCI format 0 in the common search space. That is, in a case of receiving the NACK on the PHICH (1503), the terminal apparatus 1 need not decode DCI format 0D in the UE-specific search space. The terminal apparatus 1 then transmits the PUSCH (1506), based on the HARQ indicator detected on the PHICH or DCI format 0 decoded on the PDCCH. That is, DCI format 0 is used for retransmission of the PUSCH (1502). In other words, transmission of the PUSCH (1506) is retransmission of the PUSCH (1502).

Furthermore, in a case of receiving the NACK on the PHICH (1503), the terminal apparatus 1 may attempt to decode the PDCCH for retransmission of the PUSCH (1502). That is, in a case of receiving the NACK on the PHICH (1503), the terminal apparatus 1 may decode DCI format 0 in the common search space and decode DCI format 0D in the UE-specific search space. DCI format 0 and DCI format 0D may be used for retransmission of the PUSCH (1502). Here, the number of the HARQ process indicated in the "HARQ process number" field included in DCI format 0D is identical to the number of the HARQ process for the PUSCH (1502). That is, in a case of receiving the NACK on the PHICH (1503), the terminal apparatus 1 may consider that, in the UE-specific search space, no DCI format 0D is generated that indicates the number of the HARQ process different from the number of the HARQ process for the PUSCH (1502). That is, in a case of receiving the NACK on the PHICH (1503), the terminal apparatus 1 may consider that, in the UE-specific search space, DCI format 0D is generated that indicates the same number of the HARQ process as that of the HARQ process for the PUSCH (1502). In a case of decoding DCI format 0D in the subframe n+8, the terminal apparatus 1 may transmit the PUSCH (1505) in a subframe n+11. Here, the PUSCH (1505) is retransmission of the PUSCH (1502). Furthermore, in a case of decoding DCI format 0 in the subframe n+8, the terminal apparatus 1 may transmit the PUSCH (1506) in a subframe n+12. Here, the PUSCH (1506) is retransmission of the PUSCH (1502).

Furthermore, in a case of receiving the NACK on the PHICH (1503) in the subframe n+8 and decoding DCI format 0D indicating the number of the HARQ process different from the number of the HARQ process for the PUSCH (1502), the terminal apparatus 1 may (i) perform transmission of the PUSCH based on DCI format 0D (1505)

in the subframe n+11, and (ii) perform retransmission of the PUSCH based on the NACK (1506) in the subframe n+12.

Furthermore, in a case of decoding, in the subframe n+8, the uplink grant indicating the number of the HARQ process identical to the number of the HARQ process for the PUSCH (1502), the terminal apparatus 1 may transmit the PUSCH, based on the decoded uplink grant regardless of the content of the HARQ-ACK feedback (ACK or NACK). Here, transmission of the PUSCH may be retransmission of the PUSCH (1502) or the initial transmission of the PUSCH for a new transport block.

In a serving cell not configured with the RRC layer parameter reducedProcessingTiming, the terminal apparatus 1 decodes the PHICH in the subframe n+8. At the same time, the terminal apparatus 1 may decode DCI format 0 in the common search space and the UE-specific search space in the subframe.

Figure 13:
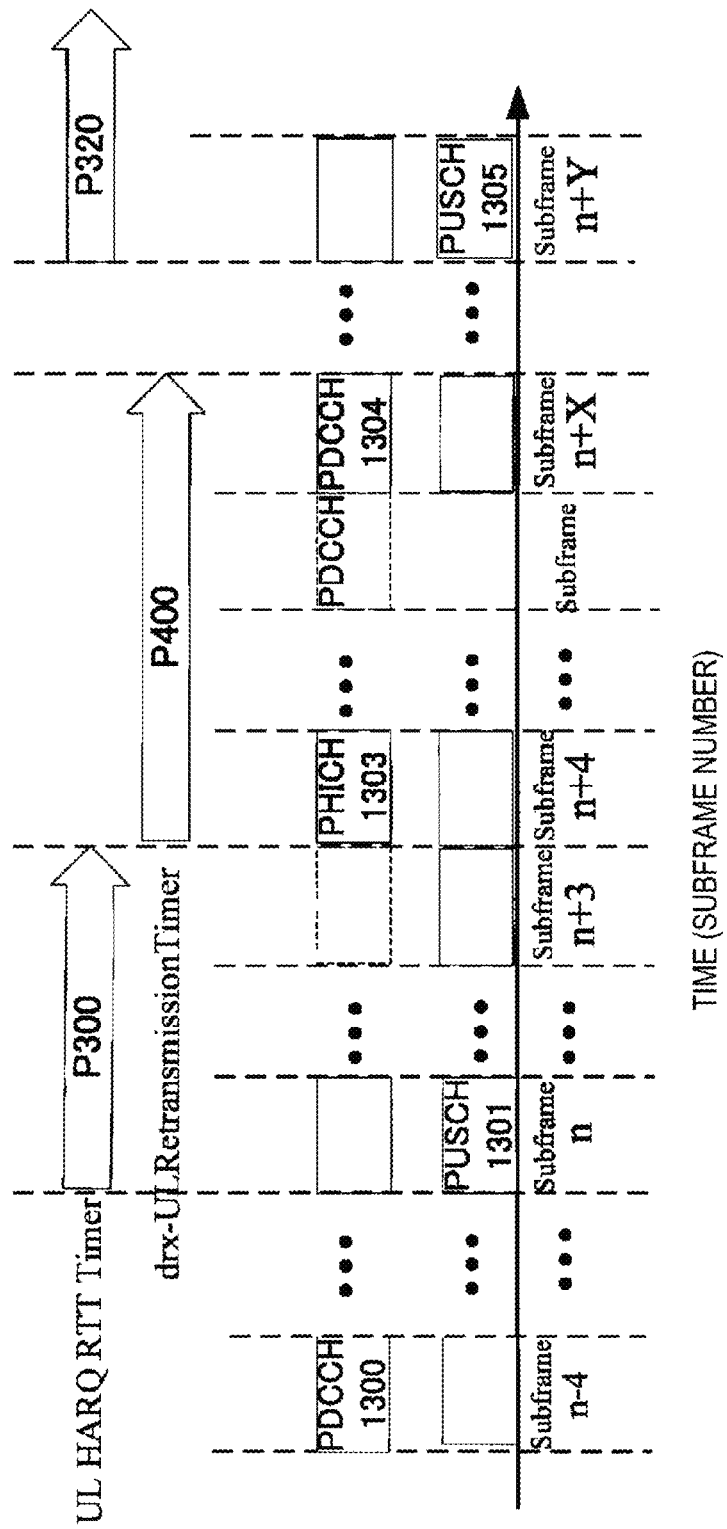
FIG. 13 is a diagram illustrating an example of transmission and retransmission of a PUSCH according to the present embodiment.

FIG. 13 is a diagram illustrating an example of transmission and retransmission of the PUSCH according to the present embodiment. In FIG. 13, all timers, initial transmissions, and retransmissions correspond to one uplink HARQ process. Hereinafter, in FIG. 13, the terminal apparatus 1 is a terminal apparatus with the shortening processing capability, and the serving cell is configured with the RRC parameter reducedProcessingTiming, unless otherwise specified. P300 and P320 indicate periods when the UL HARQ RTT timer corresponding to the uplink HARQ process is running, and P400 indicates a period when the drx-ULRetransmissionTimer corresponding to the uplink HARQ process is running. In FIG. 13, the period P400 is the active time.

The terminal apparatus 1 receives the PDCCH (1300) including the uplink grant in the subframe n−4. In FIG. 13, the PDCCH (1300) including the uplink grant is received in the common search space. The uplink grant included in the PDCCH (1300) indicates the initial transmission (1301) of the PUSCH. As described above, in a case that the uplink grant scheduling transmission of the uplink data is received in the common search space, the UL HARQ RTT timer may be configured (set) to four subframes. In other words, the value (length) of the UL HARQ RTT Timer (P300) may be configured to four subframes by the common search space in which the PDCCH (1300) scheduling the initial transmission (1301) of the PUSCH is transmitted.

Then, based on the indication of the initial transmission by the PDCCH (1300), the terminal apparatus 1 may transmit the PUSCH (1301) in the subframe n by using the normal processing time (4 ms). The HARQ process for the PUSCH scheduled by the PDCCH transmitted in the common search space is a synchronous HARQ process. That is, the PDCCH received in the common search space may indicate that the HARQ for the PUSCH (1301) is an uplink synchronous HARQ process. Here, for the terminal apparatus 1 with the shortening processing capability, the UL HARQ RTT Timer (P300) for the uplink synchronous HARQ process for the PUSCH may be started. During the period in which the UL HARQ RTT Timer (P300) for the uplink HARQ process for the PUSCH is running, the terminal apparatus 1 need not monitor the PDCCH corresponding to the uplink synchronous HARQ process. Here, the UL HARQ RTT Timer (P300) for the uplink synchronous HARQ process is configured (set) to four subframes. That is, the terminal apparatus 1 need not monitor the PDCCH corresponding to the uplink synchronous HARQ process during a sequence of subframes preceding the subframe n+4. That is, the terminal apparatus 1 may monitor the PDCCH corresponding to the uplink synchronous HARQ process during a sequence of subframes starting with the subframe n+4.

Then, the terminal apparatus 1 may start the drx-ULRetransmissionTimer (P400) in the subframe n+4 where the UL HARQ RTT Timer (P300) expires, and monitor the PDCCH corresponding to the uplink HARQ process for the PUSCH (1301).

In the uplink synchronous HARQ process, the HARQ indicator is transmitted on the PHICH (1303) in the subframe n+4 in response to transmission of the PUSCH (1301). In a case of receiving the NACK on the PHICH (1303) and failing to detect the PDCCH in the subframe, the terminal apparatus 1 may perform non-adaptive retransmission of the PUSCH (1305) by using the normal processing time in a subframe n+Y. In this case, the subframe n+Y is the fourth succeeding subframe from the subframe where NACK has been received. In other words, here, the value of Y may be 8.

Furthermore, in a case of receiving the NACK on the PHICH (1303), the terminal apparatus 1 need not start the drx-ULRetransmissionTimer (P400). In this case, the terminal apparatus 1 may attempt to decode the PDCCH corresponding to the uplink synchronous HARQ process in the subframe n+4. Furthermore, in a case of receiving the NACK on the PHICH (1303), the terminal apparatus 1 may start the drx-ULRetransmissionTimer (P400). In this case, the terminal apparatus 1 may attempt to decode the PDCCH corresponding to the uplink synchronous HARQ process during a period from the subframe in which the NACK has been received to the third succeeding subframe from the subframe in which the NACK has been received. In other words, in this case, the drx-ULRetransmissionTimer (P400) may stop before the subframe for the non-adaptive retransmission of the PUSCH and may be four subframes. For example, in a case of detecting the corresponding PDCCH (1304), the terminal apparatus 1 may stop the non-adaptive retransmission of the PUSCH based on the NACK and retransmit the PUSCH based on the detected PDCCH. In this case, the value of X is a value smaller than 8.

Furthermore, in a case of receiving the ACK on the PHICH (1303), the terminal apparatus 1 may start the drx-ULRetransmissionTimer (P400). The terminal apparatus 1 may then monitor the PDCCH corresponding to the uplink synchronous HARQ process during a period when the drx-ULRetransmissionTimer (P400) is running. For example, in a case of detecting (decoding) the PDCCH (1304) corresponding to the uplink synchronous HARQ process in the subframe n+X, the terminal apparatus 1 may stop drx-ULRetransmissionTimer (P400). Note that the value of the drx-ULRetransmissionTimer applied to the uplink synchronous HARQ process may be provided by a higher layer parameter. The drx-ULRetransmissionTimer applied to the uplink synchronous HARQ process may be the same as drx-ULRetransmissionTimer applied to the uplink asynchronous HARQ process. Furthermore, unlike the drx-ULRetransmissionTimer applied to the uplink asynchronous HARQ process, the drx-ULRetransmissionTimer applied to the uplink synchronous HARQ process may be defined as a new higher layer parameter.

Subsequently, the terminal apparatus 1 may retransmit the PUSCH (1305) in the subframe n+Y, based on the detected PDCCH (1304). In a case of detecting the PDCCH (1304) in the common search space, the terminal apparatus 1 may retransmit the PUSCH (1305) in the fourth succeeding subframe from the subframe n+X by using the normal processing time. In this case, the UL HARQ RTT Timer (P320) may be configured (set) to four subframes. Furthermore, in a case of detecting the PDCCH (1304) in the UE-specific search space, the terminal apparatus 1 may retransmit the PUSCH (1305) in the third succeeding subframe from the subframe n+X by using the short processing time. In this case, the UL HARQ RTT Timer (P320) may be configured (set) to three subframes. In other words, the value (length) of the UL HARQ RTT Timer (P320) may be provided by the type of the search space in which the PDCCH (1304) scheduling retransmission of the PUSCH (1305) is transmitted.

Figure 14:
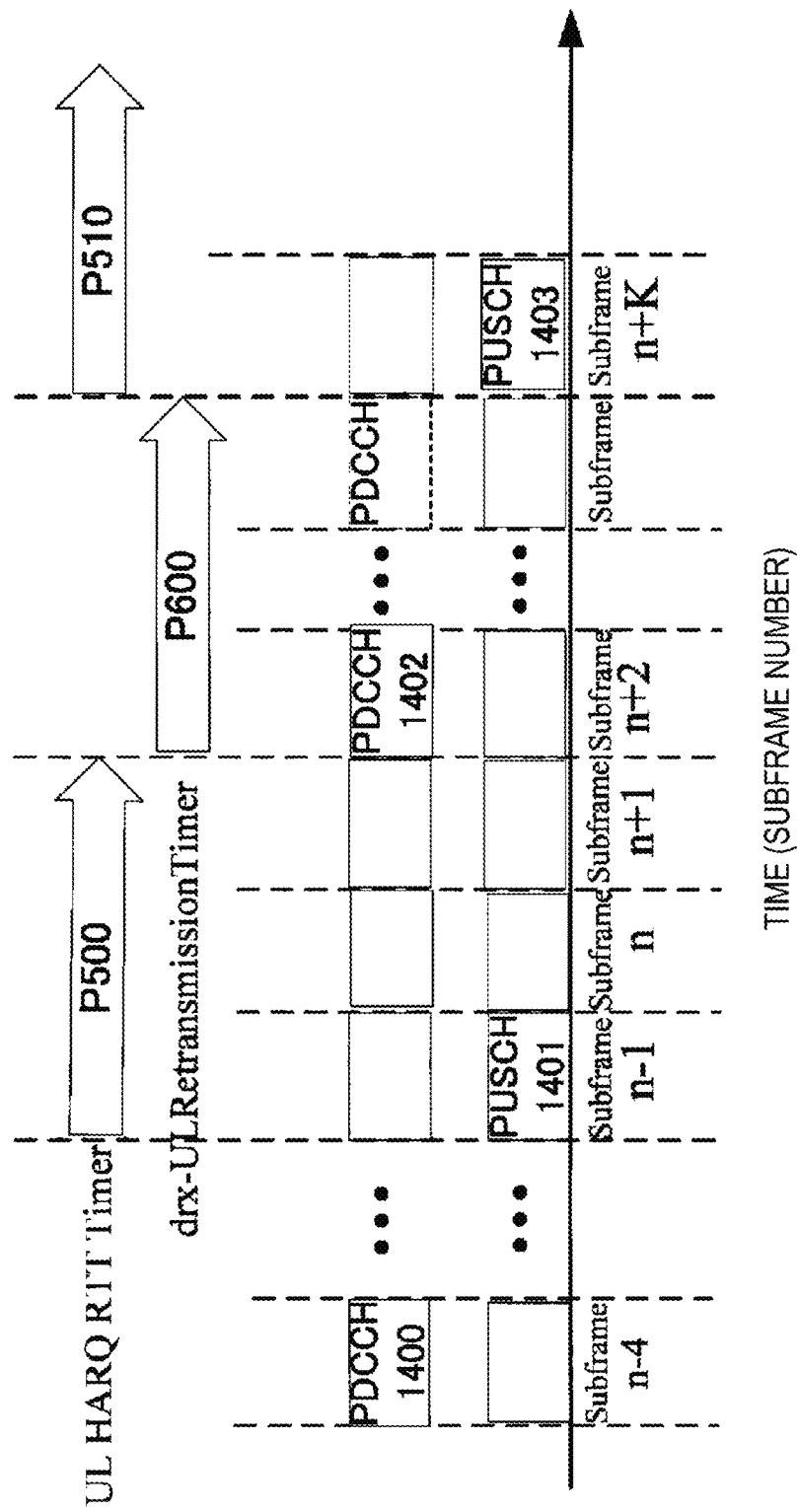
FIG. 14 is a diagram illustrating another example of transmission and retransmission of a PUSCH according to the present embodiment.

FIG. 14 is a diagram illustrating another example of transmission and retransmission of the PUSCH according to the present embodiment. In FIG. 14, all timers, initial transmissions, and retransmissions correspond to one uplink HARQ process. Hereinafter, in FIG. 14, the terminal apparatus 1 is a terminal apparatus with the shortening processing capability, and the RRC parameter reducedProcessingTiming is configured for the serving cell, unless otherwise specified. P500 and P510 indicate a period when the UL HARQ RTT timer for the uplink HARQ process is running, and P600 indicates a period when the drx-ULRetransmissionTimer corresponding to the uplink HARQ process is running. In FIG. 14, the period P600 is the active time.

The terminal apparatus 1 receives the PDCCH (1400) including the uplink grant in the subframe n−4. In FIG. 14, the PDCCH (1400) including the uplink grant is received in the UE-specific search space. The uplink grant included in the PDCCH (1400) indicates the initial transmission (1401) of the PUSCH. In a case that the uplink grant scheduling transmission of the uplink data is received in the UE-specific search space, the UL HARQ RTT timer may be configured (set) for three subframes. That is, the value (length) of the UL HARQ RTT Timer (P500) may be set for three subframes by the UE-specific search space in which the PDCCH (1400) scheduling the initial transmission of the PUSCH (1401) is transmitted.

Then, based on the indication of the initial transmission by the PDCCH (1400), the terminal apparatus 1 may transmit the PUSCH (1401) in the subframe n−1 using the reduced processing time (3 ms). The asynchronous HARQ process for the PUSCH scheduled by the PDCCH transmitted in the UE-specific search space is an asynchronous HARQ process. That is, the PDCCH received in the UE-specific search space may indicate that the HARQ for the PUSCH (1401) is an uplink asynchronous HARQ process. The UL HARQ RTT Timer (P500) for the uplink asynchronous HARQ process for the PUSCH may be started. During a period when the UL HARQ RTT Timer (P500) for the PUSCH uplink HARQ process for the PUSCH is running, the terminal apparatus 1 need not monitor the PDCCH corresponding to the uplink asynchronous HARQ process. Here, the UL HARQ RTT Timer (P500) for the uplink asynchronous HARQ process may be configured (set) to three subframes. That is, the terminal apparatus 1 need not monitor the PDCCH corresponding to the uplink asynchronous HARQ process in the sequence of subframes preceding a subframe n+2.

Then, the terminal apparatus 1 may start the drx-ULRetransmissionTimer (P600) in the subframe n+2 in which the UL HARQ RTT Timer (P300) expires and monitor the PDCCH corresponding to the uplink HARQ process for the PUSCH (1401). That is, the terminal apparatus 1 may monitor the PDCCH corresponding to the uplink asynchronous HARQ process during a sequence of subframes starting with the subframe n+2 and corresponding to a period when the P600 is running.

The terminal apparatus 1 may monitor the PDCCH corresponding to the uplink asynchronous HARQ process during the period when the drx-ULRetransmissionTimer (P600) is running. For example, in a case of detecting (decoding) the PDCCH (1402) corresponding to the uplink asynchronous HARQ process in the subframe n+2, the terminal apparatus 1 may stop the drx-ULRetransmissionTimer (P600). Subsequently, based on the detected PDCCH (1402), the terminal apparatus 1 may retransmit the PUSCH (1403) in a subframe n+K. In a case of detecting the PDCCH (1402) in the common search space, the terminal apparatus 1 may retransmit PUSCH (1403) in the fourth succeeding subframe from the subframe n+2 using the normal processing time. In this case, the UL HARQ RTT Timer (P510) may be configured (set) for four subframes. Furthermore, in a case of detecting the PDCCH (1402) in the UE-specific search space, the terminal apparatus 1 may retransmit the PUSCH (1403) in the third succeeding subframe from the subframe n+2 using the short processing time. In this case, the UL HARQ RTT Timer (P510) may be configured (set) to three subframes. In other words, the value (length) of the UL HARQ RTT Timer (P510) may be provided by the type of the search space in which the PDCCH (1402) scheduling retransmission of the PUSCH (1403) is transmitted.

Furthermore, in the present embodiment, the value of the UL HARQ RTT Timer corresponding to the uplink HARQ process may be provided by the type of the search space in which PDCCH scheduling the initial transmission of the PUSCH is transmitted. For example, in FIGS. 13, P300 and P320 may have the same value, and the value may be configured to four subframes because the PDCCH (1300) scheduling the initial transmission of the PUSCH (1301) is the common search space. In other words, even in a case that the PDCCH (1304) scheduling retransmission of the PUSCH (1305) is transmitted in the UE-specific search space, the value of P320 is the same as the value of P300 and may be configured to four subframes, based on the type of the PDCCH scheduling the initial transmission of the PUSCH (1301). Furthermore, for example, in FIGS. 14, P500 and P510 may have the same value, and the value may be configured to three subframes because the PDCCH (1400) scheduling the initial transmission of the PUSCH (1401) is the UE-specific search space. In other words, even in a case that the PDCCH (1402) scheduling retransmission of the PUSCH (1403) is transmitted in the common search space, the value of P510 is the same as the value of P500 and may be configured to three subframes, based on the type of the PDCCH (1400) scheduling the initial transmission of the PUSCH (1401).

By way of example, in the present embodiment, for example, for a terminal apparatus 1 with the shortening processing capability, the value (length) of the UL HARQ RTT Timer need not be based on the type of the search space in which the PDCCH scheduling uplink transmission is transmitted in the serving cell configured with the RRC parameter reducedProcessingTiming, and may be configured to the same value (e.g., three subframes). In FIG. 13, even in a case that the PDCCH (1300) scheduling transmission of PUSCH (1301) is transmitted in the common search space, the value of P300 may be configured to three subframes. In this case, the terminal apparatus 1 need not monitor the PDCCH corresponding to the uplink synchronous HARQ process during a sequence of subframes preceding a subframe n+3. That is, the terminal apparatus 1 may monitor the PDCCH corresponding to the uplink synchronous HARQ process for the PUSCH (1301) during a sequence of subframes starting with a subframe n+3. In a case of detecting the corresponding PDCCH in the subframe n+3, the terminal apparatus 1 may or may not receive the PHICH in the subframe n+4. In other words, in this case, the terminal apparatus 1 may transmit the PUSCH, based on the uplink grant (PDCCH) decoded in the subframe n+3 regardless of the content of the HARQ-ACK feedback (ACK or NACK) in the subframe n+4. Furthermore, in FIG. 14, even in a case that the PDCCH (1400) scheduling transmission of the PUSCH (1401) is transmitted in the UE-specific search space, the value of P500 may be set to three subframes as is the case with P300.

By way of example, in the present embodiment, for example, for a terminal apparatus 1 with the shortening processing capability, the value (length) of the UL HARQ RTT Timer need not be based on the type of the uplink HARQ process in the serving cell configured with the RRC parameter reducedProcessingTiming, and may be configured to the same value (e.g., three subframes). In FIG. 13, even in a case that the HARQ for the PUSCH (1301) is the uplink synchronous HARQ process, the value of P300 may be configured to three subframes. Furthermore, in FIG. 14, even in a case that the HARQ for the PUSCH (1401) is the uplink asynchronous HARQ process, the value of P500 may be configured to three subframes as is the case with P300.

Furthermore, by way of example, in the present embodiment, the ULRetransmissionTimer may be defined as a new RRC parameter regardless of the DRX operation. The RRC parameter may be used to indicate the maximum number of consecutive PDCCH subframes for uplink retransmission expected by the terminal apparatus 1. In a case that the RRC parameter reducedProcessingTiming is configured and the RRC parameter ULRetransmissionTimer is configured, the ULRetransmissionTimer may be used regardless of the DRX operation. In other words, in the serving cell configured with the RRC parameter reducedProcessingTiming, the terminal apparatus 1 with the shortening processing capability may start, regardless of the DRX operation, the ULRetransmissionTimer after the UL HARQ RTT timer corresponding to the uplink HARQ process expires, and during the period when the ULRetransmissionTimer is indicated, monitor the PDCCH for uplink retransmission for the uplink HARQ process.

Configurations of apparatuses according to the present embodiment will be described below.

Figure 16:
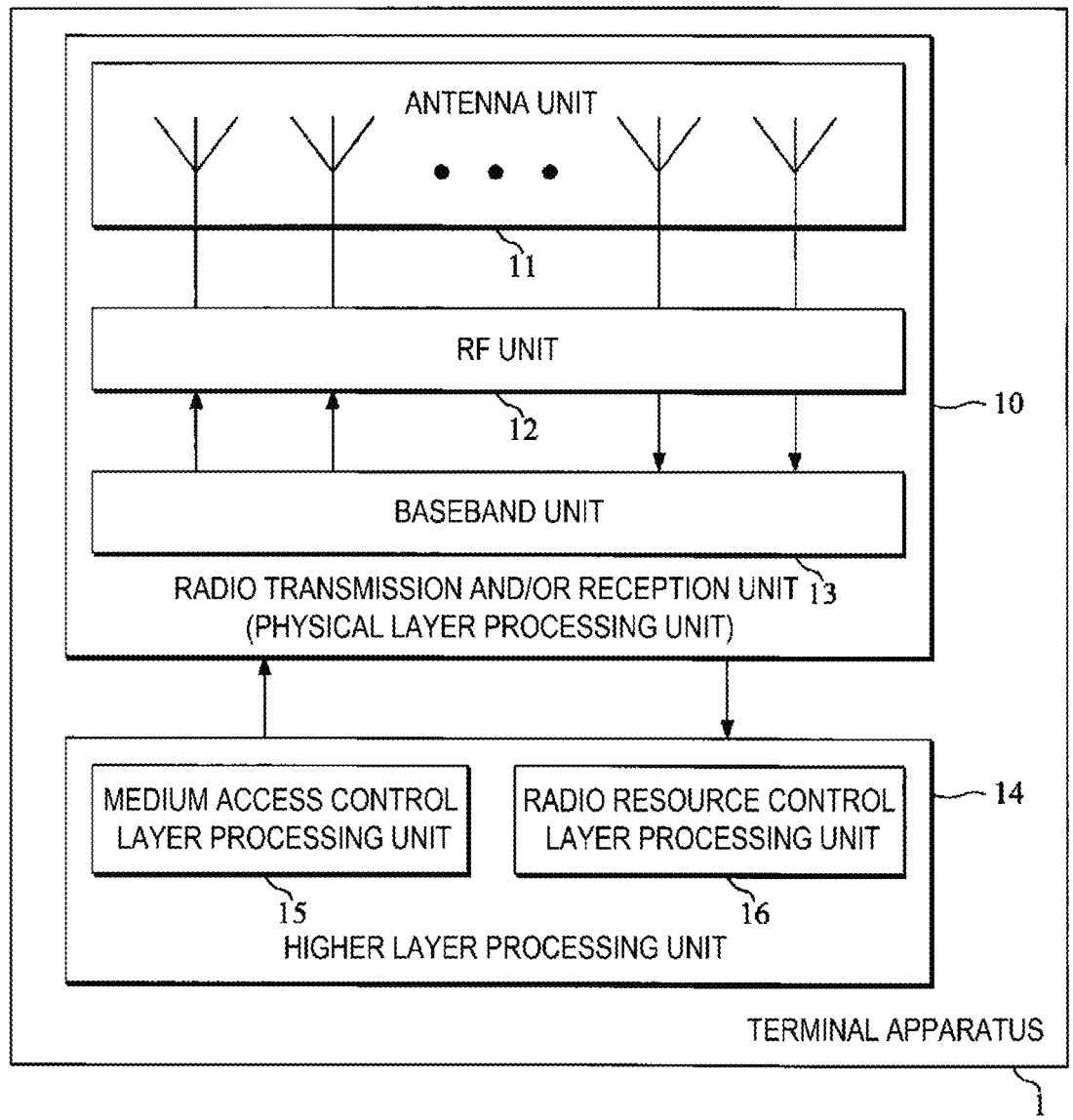
FIG. 16 is a schematic block diagram illustrating a configuration of a terminal apparatus 1 according to the present embodiment.

FIG. 16 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, a Packet Data Convergence Protocol (PDCP) layer, a Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls HARQ in accordance with the various pieces of configuration information/parameters managed by the radio resource control layer processing unit 16. The medium access control layer processing unit 15 manages multiple HARQ entities, multiple HARQ processes, and multiple HARQ buffers.

The medium access control layer processing unit 15 identifies (selects, determines) a PDCCH subframe. The medium access control layer processing unit 15 performs processing of DRX, based on the PDCCH subframe. The medium access control layer processing unit 15 manages a timer relating to DRX, based on the PDCCH subframe. The medium access control layer processing unit 15 indicates to the radio transmission and/or reception unit 10 to monitor the PDCCH in the subframe. The monitoring of the PDCCH denotes an attempt to decode the PDCCH in accordance with a DCI format.

The radio resource control layer processing unit 16 included in the higher layer processing unit 14 performs processing of the Radio Resource Control layer. The radio resource control layer processing unit 16 manages various types of configuration information/parameters of its own apparatus. The radio resource control layer processing unit 16 sets the various pieces of configuration information/parameters in accordance with RRC layer signaling received from the base station apparatus 3. Namely, the radio resource control unit 16 sets the various configuration information/parameters in accordance with the information indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Further, the RF unit 12 amplifies power. Still further, the RF unit 12 may have a function of controlling transmit power. The RF unit 12 is also referred to as a transmit power control unit.

Figure 17:
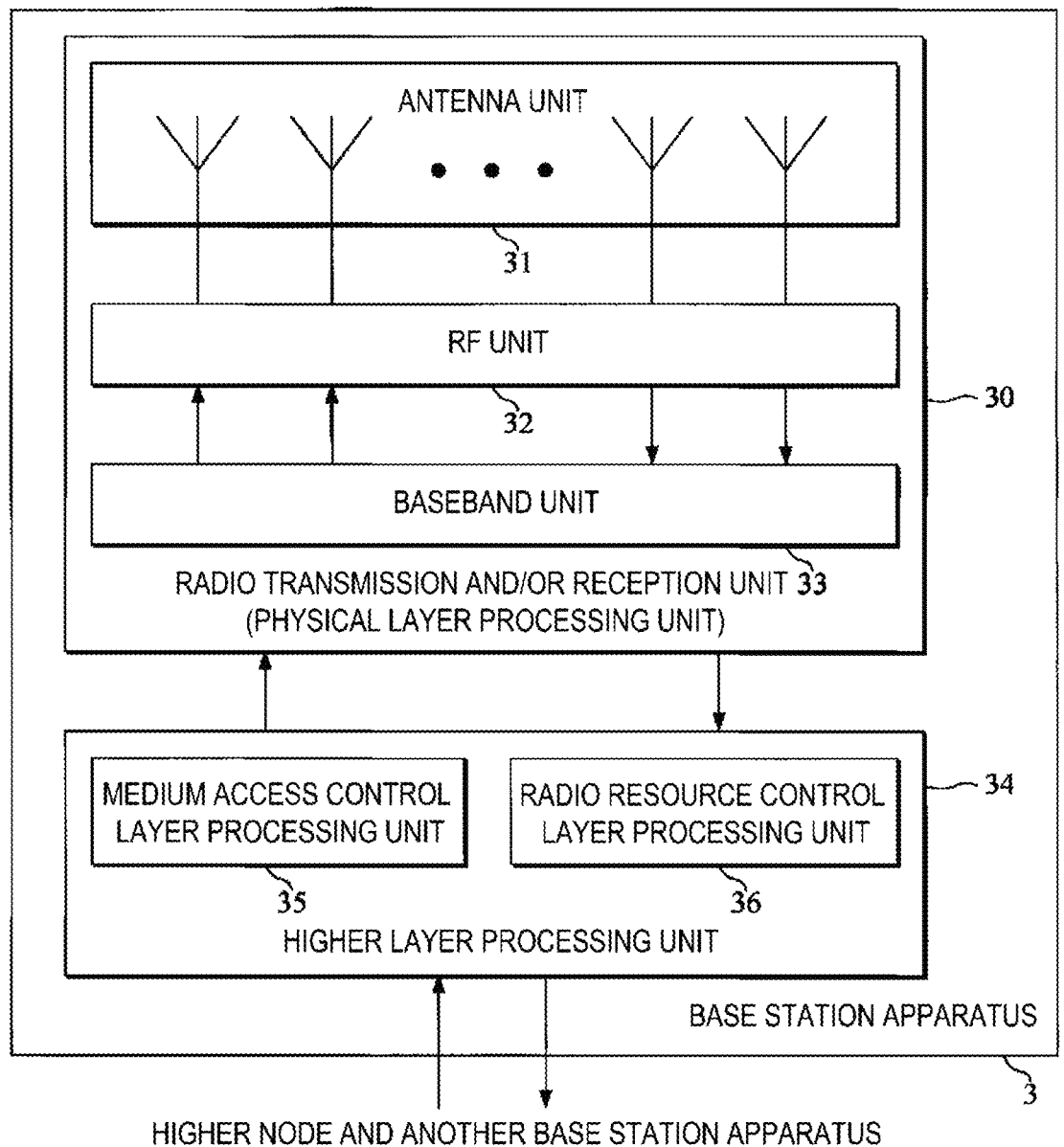
FIG. 17 is a schematic block diagram illustrating a configuration of a base station apparatus 3 according to the present embodiment.

FIG. 17 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of the Medium Access Control (MAC) layer, a Packet Data Convergence Protocol (PDCP) layer, a Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 15 controls HARQ in accordance with the various pieces of configuration information/parameters managed by the radio resource control layer processing unit 16. The medium access control layer processing unit 15 generates an ACK/NACK and HARQ information with respect to uplink data (UL-SCH). The ACK/NACK and HARQ information with respect to the uplink data (UL-SCH) are transmitted to the terminal apparatus 1 on the PHICH or the PDCCH.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signal. That is, the radio resource control layer processing unit 36 transmits/broadcasts information indicating various types of configuration information/parameters.

The functionality of the radio transmission and/or reception unit 30 is similar to the functionality of the radio transmission and/or reception unit 10, and hence description thereof is omitted.

Each of the units having the reference signs 30 to 36 included in the base station apparatus 3 may be configured as a circuit. Each of the units having the reference signs 10 to 16 included in the terminal apparatus 1 may be configured as a circuit.

Hereinafter, various aspects of the terminal apparatus and the base station apparatus in the present embodiment will be described.

(1) A first aspect of the present embodiment is a terminal apparatus including: a receiver configured to receive a PDCCH including a DCI format; and a transmitter configured to perform PUSCH transmission, based on detection of the PDCCH, wherein in an HARQ process corresponding to the PUSCH transmission, a value of an UL HARQ Round Trip Timer (RTT) timer for the HARQ process is provided based at least on a first condition and/or a second condition, wherein the first condition is that a search space for the PDCCH detected is either a common search space or a UE-specific search space, and the second condition is that a type of the HARQ process is either a synchronous HARQ or an asynchronous HARQ.

(2) In the first aspect of the present embodiment, for FDD, in a case that the PDCCH is detected in the common search space, the value of the UL HARQ RTT timer is four subframes, and in a case that the PDCCH is detected in the UE-specific search space, the value of the UL HARQ RTT timer is three subframes.

(3) In the first aspect of the present embodiment, for FDD, in a case that the HARQ process is the synchronous HARQ, the value of the UL HARQ RTT timer is four subframes, and in a case that the HARQ process is the asynchronous HARQ, the value of the UL HARQ RTT timer is three subframes.

(4) A second aspect of the present embodiment is a terminal apparatus including: a receiver configured to receive a PDCCH including a DCI format; and a transmitter configured to perform, in a PUCCH, transmission of an HARQ-ACK in response to PDSCH reception, based on detection of the PDCCH, wherein in an HARQ process corresponding to the PDSCH reception, a value of an HARQ Round Trip Timer (RTT) timer for the HARQ process is provided based at least on a third condition, and the third condition is that a search space for the PDCCH detected is either a common search space or a UE-specific search space.

(5) In the second aspect of the present embodiment, for FDD, in a case that the PDCCH is detected in the common search space, the value of the HARQ RTT timer is eight subframes, and in a case that the PDCCH is detected in the UE-specific search space, the value of the HARQ RTT timer is six subframes.

With this configuration, the terminal apparatus 1 is capable of efficiently communicating with the base station apparatus 3.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus capable of short processing time comprising:
   reception circuitry configured and/or programmed to receive a first physical downlink control channel (PDCCH) with cyclic redundancy check scrambled by cell-radio network identifier (C-RNTI) including an uplink grant in a serving cell; and
   transmission circuitry configured and/or programmed to perform uplink transmission in physical uplink shared channel (PUSCH) in the serving cell upon a detection of the first PDCCH, wherein
   in a case that a first radio resource control (RRC) parameter associated with short processing time is received for the serving cell, and the first PDCCH is decoded in a terminal apparatus specific search space, a hybrid auto repeat request (HARQ) process corresponding to the uplink grant is determined as an asynchronous HARQ process, and
   in the case that the first RRC parameter is received for the serving cell, and the first PDCCH is decoded in common search space, the HARQ process corresponding to the uplink grant is determined as a synchronous HARQ process.

2. A base station apparatus comprising:
   transmission circuitry configured and/or programmed to transmit a first physical downlink control channel (PDCCH) with cyclic redundancy check scrambled by cell-radio network identifier (C-RNTI) including an uplink grant in a serving cell, reception circuitry configured and/or programmed to receive uplink transmission in physical uplink shared channel (PUSCH) in the serving cell based on the first PDCCH, wherein in a case that a first radio resource control (RRC) parameter associated with short processing time is transmitted for the serving cell, and the first PDCCH is transmitted in a terminal apparatus specific search space, a hybrid auto repeat request (HARQ) process corresponding to the uplink grant is determined as an asynchronous HARQ process, and in the case that the first RRC parameter is transmitted for the serving cell, and the first PDCCH is transmitted in common search space, the HARQ process corresponding to the uplink grant is determined as a synchronous HARQ process.

3. A communication method used for a terminal apparatus, the communication method comprising:

receiving a first physical downlink control channel (PDCCH) with cyclic redundancy check scrambled by cell-radio network identifier (C-RNTI) including an uplink grant in a serving cell, performing uplink transmission in physical uplink shared channel (PUSCH) in the serving cell upon a detection of the first PDCCH, wherein in a case that a first radio resource control (RRC) parameter associated with short processing time is received for the serving cell, and the first PDCCH is decoded in a terminal apparatus specific search space, a hybrid auto repeat request (HARQ) process corresponding to the uplink grant is determined as an asynchronous HARQ process, and in the case that the first RRC parameter is received for the serving cell, and the first PDCCH is decoded in common search space, the HARQ process corresponding to the uplink grant is determined as a synchronous HARQ process.

4. A communication method used for a base station apparatus, the communication method comprising:

transmitting a first physical downlink control channel (PDCCH) with cyclic redundancy check scrambled by cell-radio network identifier (C-RNTI) including an uplink grant in a serving cell, receiving uplink transmission in physical uplink shared channel (PUSCH) in the serving cell based on the first PDCCH, wherein in a case that a first radio resource control (RRC) parameter associated with short processing time is transmitted for the serving cell, and the first PDCCH is transmitted in a terminal apparatus specific search space, a hybrid auto repeat request (HARQ) process corresponding to the uplink grant is determined as an asynchronous HARQ process, and in the case that the first RRC parameter is transmitted for the serving cell, and the first PDCCH is coded in common search space, the HARQ process corresponding to the uplink grant is determined as a synchronous HARQ process.

* * * * *